(12) United States Patent
Polivka et al.

(10) Patent No.: US 8,015,695 B2
(45) Date of Patent: Sep. 13, 2011

(54) REINSTATEMENT OF AN EXISTING CONNECTION IN A LINED CONDUIT

(75) Inventors: Richard C. Polivka, Lemont, IL (US);
Keith B. Oxner, Chesterfield, MO (US);
Stephen B. Heuiser, Manchester, MO (US)

(73) Assignee: INA Acquisition Corp., Wilmington, DE (US)

( * ) Notice: Subject to any disclaimer, the term of this patent is extended or adjusted under 35 U.S.C. 154(b) by 1163 days.

(21) Appl. No.: 11/796,379

(22) Filed: Apr. 27, 2007

(65) Prior Publication Data
US 2007/0284876 A1    Dec. 13, 2007

Related U.S. Application Data

(60) Provisional application No. 60/795,364, filed on Apr. 27, 2006, provisional application No. 60/800,914, filed on May 16, 2006, provisional application No. 60/872,826, filed on Dec. 5, 2006.

(51) Int. Cl.
*B23P 21/00* (2006.01)
*B23P 6/00* (2006.01)
(52) U.S. Cl. .......... 29/709; 29/33 T; 29/700; 29/402.02; 29/402.09
(58) Field of Classification Search .............. 29/700, 29/702, 703, 709, 33 T, 402.02, 402.09, 402.14, 29/402.15, 402.17
See application file for complete search history.

(56) References Cited

U.S. PATENT DOCUMENTS

| | | | |
|---|---|---|---|
| 1,887,423 A | 11/1932 | Parker | |
| 3,173,712 A | 3/1965 | Zahuranec et al. | |
| 3,531,142 A | 9/1970 | Peasley | |
| 4,009,063 A | 2/1977 | Wood | |
| 4,064,211 A | 12/1977 | Wood | |
| 4,197,908 A | 4/1980 | Davis et al. | |
| 4,434,115 A | 2/1984 | Chick | |
| 4,442,891 A | 4/1984 | Wood | |
| 4,577,388 A * | 3/1986 | Wood | 29/558 |
| 4,630,676 A | 12/1986 | Long, Jr. | |

(Continued)

FOREIGN PATENT DOCUMENTS

DE    4024926 A1    2/1992

(Continued)

OTHER PUBLICATIONS

International Search Report for PCT/US2007/010366 dated Oct. 28, 2008, 14 pages.

*Primary Examiner* — Essama Omgba

(57) ABSTRACT

A process and apparatus for internally reinstating a connection in a lined conduit is provided. The connection may be a branch pipe or corporation stop that may or may not protrude into the conduit. It may be milled prior to lining. The process includes the step of locating the connection visually or with a probe, such as all eddy current probe. forming at an opening in the lining at the connection and then installing a T-nut with a sealing gasket facing the liner to hold the liner in place and form a seal between the T-nut and liner and the connection. The apparatus includes a motor coupled to a turntable with drive to install the T-nut and a supply of T-nuts mounted on a slide for loading the T-nuts onto the drive for installation of the T-nuts without having to remove the assembly between each installation.

4 Claims, 26 Drawing Sheets

U.S. PATENT DOCUMENTS

| | | | |
|---|---|---|---|
| 4,648,454 A | 3/1987 | Yarnell | |
| 4,701,988 A | 10/1987 | Wood | |
| 4,724,108 A | 2/1988 | Jurgenlohmann et al. | |
| 4,778,553 A | 10/1988 | Wood | |
| 4,785,512 A * | 11/1988 | Sigel | 29/33 T |
| 4,786,345 A | 11/1988 | Wood | |
| 4,819,721 A | 4/1989 | Long, Jr. | |
| 4,867,921 A | 9/1989 | Steketee, Jr. | |
| 4,893,841 A | 1/1990 | Bowen | |
| 4,907,911 A | 3/1990 | Rodriguez et al. | |
| 4,923,663 A | 5/1990 | McMillan | |
| 4,951,758 A | 8/1990 | Sonku et al. | |
| 4,955,951 A * | 9/1990 | Nemoto et al. | 166/55.7 |
| 4,986,314 A * | 1/1991 | Himmler | 138/97 |
| 4,991,006 A | 2/1991 | Wood | |
| 5,018,545 A | 5/1991 | Wells | |
| 5,044,405 A | 9/1991 | Driver et al. | |
| 5,044,824 A | 9/1991 | Long, Jr. et al. | |
| 5,046,903 A * | 9/1991 | Nagayoshi et al. | 409/143 |
| 5,108,533 A | 4/1992 | Long, Jr. et al. | |
| 5,153,718 A | 10/1992 | Massar | |
| 5,197,540 A | 3/1993 | Yagi et al. | |
| 5,199,145 A | 4/1993 | McMillan et al. | |
| 5,207,031 A * | 5/1993 | Gammelgaard | 451/440 |
| 5,240,290 A | 8/1993 | Kim | |
| 5,253,956 A * | 10/1993 | Fisco et al. | 405/184.2 |
| 5,255,624 A | 10/1993 | Legare | |
| 5,280,670 A * | 1/1994 | Toomey et al. | 29/33 T |
| 5,318,395 A | 6/1994 | Driver | |
| 5,393,481 A | 2/1995 | Wood | |
| 5,520,569 A | 5/1996 | Endoh | |
| 5,540,613 A | 7/1996 | Kamiyama et al. | |
| 5,577,864 A | 11/1996 | Wood et al. | |
| 5,609,439 A | 3/1997 | Schreiner et al. | |
| 5,660,202 A * | 8/1997 | Rush et al. | 137/318 |
| 5,692,543 A | 12/1997 | Wood | |
| 5,737,822 A | 4/1998 | Driver et al. | |
| 5,915,419 A | 6/1999 | Tweedie et al. | |
| 5,916,406 A | 6/1999 | Kamiyama et al. | |
| 5,927,341 A | 7/1999 | Taylor | |
| 5,934,332 A | 8/1999 | Rodriguez et al. | |
| 5,944,058 A | 8/1999 | Kamiyama et al. | |
| 5,960,882 A | 10/1999 | Polivka | |
| 5,971,032 A | 10/1999 | Ward | |
| 6,001,212 A | 12/1999 | Polivka et al. | |
| 6,029,726 A | 2/2000 | Tweedie et al. | |
| 6,056,017 A | 5/2000 | Kamiyama et al. | |
| 6,068,725 A | 5/2000 | Tweedie et al. | |
| 6,082,411 A | 7/2000 | Ward | |
| 6,085,794 A | 7/2000 | Kamiyama et al. | |
| 6,123,109 A | 9/2000 | Kamiyama et al. | |
| 6,146,491 A | 11/2000 | Wood et al. | |
| 6,206,049 B1 | 3/2001 | Ward | |
| 6,651,699 B2 | 11/2003 | Kweon | |
| 6,688,337 B2 | 2/2004 | Ward | |
| 7,073,536 B2 | 7/2006 | Blackmore et al. | |
| 7,131,791 B2 * | 11/2006 | Whittaker et al. | 405/184.2 |
| 7,221,083 B2 | 5/2007 | Oaku et al. | |
| 7,631,665 B2 * | 12/2009 | Muhlin | 138/98 |
| 7,707,704 B2 | 5/2010 | Crocker et al. | |
| 7,710,281 B2 * | 5/2010 | Smith et al. | 340/603 |
| 2004/0078954 A1 * | 4/2004 | Crocker et al. | 29/522.1 |
| 2007/0220733 A1 * | 9/2007 | Crocker et al. | 29/522.1 |

FOREIGN PATENT DOCUMENTS

| | | |
|---|---|---|
| DE | 19504139 A1 | 8/1996 |
| DE | 202005004781 U1 | 6/2005 |
| EP | 0253630 A1 | 1/1988 |
| EP | 0260220 A1 | 3/1988 |
| EP | 0462527 A1 | 12/1991 |
| EP | 0506181 A1 | 9/1992 |
| EP | 0310679 B1 | 7/1993 |
| EP | 0640727 A1 | 3/1995 |
| EP | 0978681 B1 | 4/2004 |
| GB | 566954 | 1/1945 |
| GB | 2041147 A | 9/1980 |
| GB | 2172358 A | 9/1986 |
| GB | 2282653 A | 4/1995 |
| JP | 01317745 A | 12/1989 |
| JP | 02275196 A | 11/1990 |
| JP | 05059761 A | 3/1993 |
| JP | 05263980 A | 10/1993 |
| WO | 9015347 A1 | 12/1990 |
| WO | 9111283 A1 | 8/1991 |
| WO | 9410495 A1 | 5/1994 |
| WO | 9945307 A1 | 9/1999 |
| WO | 03078886 A1 | 9/2003 |

* cited by examiner

REINSTATEMENT OF AN EXISTING CONNECTION IN A LINED CONDUIT

CROSS-REFERENCE TO RELATED APPLICATIONS

This application is based on and claims the benefit of U.S. Provisional applications No. 60/795,364 filed Apr. 27, 2006, No. 60/800,914 filed May 16, 2006 and No. 60/872,826 filed Dec. 5, 2006.

BACKGROUND OF THE INVENTION

This invention relates to an apparatus and method for internally reinstating a connection in a lined conduit, and more particularly to the internal reinstatement of a service in a conduit that has an installed corporation stop.

A variety of circumstances exist in which it is desirable to form a junction or branch line from a main, fluid-carrying conduit. For instance, in the municipal area, it is often necessary to install a branch line into a water main, gas main or sewer main. A similar need exists in other industries, such as in the chemical pipeline industries.

In the municipal area, many water mains were constructed years ago and the wall structures are now badly eroded or collapsing. In order to repair such damage, it has been proposed to install a liner within these lines to provide a new water-impervious wall to the system. There are a wide variety of different methods available in the art for inserting liners within existing conduits. These lining methods include the cured-in-place, fold-and-form and diameter reduction methods, each of which inserts a liner from one end of the conduit to the other. However, the wall of the line is usually not continuous since branch lines and service connections intersect the main conduit at various entry ports to allow the free flow of fluid from the main to the branch service line. In the case of existing and newly formed entry ports, it is desirable to utilize a corporation stop at the junction to control the fluid on either a temporary or a permanent basis.

It is desirable to reinstate the connection internally after the lining operation. To be successful, the reinstatement must form a seal between the reconnection member and the lining and between the reconnection member and the branch or service connection.

In the case of service connections, there are a variety of corporation stops in the prior art. All suffer from some deficiency. Many of the prior art assemblies are complicated in design and are time consuming to install. Standardized machinery has been developed for installing corporation stops in conduits carrying fluid under pressure, such as the B-101 drilling and tapping machines manufactured by Mueller Co. However, this machinery is not well suited for use with a conduit that has been lined or rehabilitated with a synthetic liner.

A prior art corporation stop assembly that is specifically designed for installation in a conduit lined with a synthetic liner from the outside is disclosed in U.S. Pat. No. 5,199,145 to McMillan et al. While entirely suitable, such method requires excavation of the buried conduit to install the connection externally. The McMillan et al. corporation stop has a flexible sleeve member and a threaded stem with an enlarged head portion, and is installed into the lined conduit by way of a clamp nut that engages the neck portion of the threaded stem for forcibly moving the lower end of the sleeve member over the head portion of the stem to expand the lower end of the sleeve member inside the conduit to form an internal seal with an opening in the conduit.

Another example of an external tap being installed from the outside of the conduit is disclosed in U.S. Pat. No. 5,737,822 to Driver et al. They disclose a corporation stop assembly for use with standard tapping equipment including a threaded stem with an enlarged, conical head for forming a blind side seal. A standard saddle having a radially-inward tab is placed on the external sidewall of the conduit about the opening and receives the compression ring, the tab engaging the notch in the compression ring. The stem, saddle member and compression ring engage each other to prevent relative rotation during installation.

While these devices allow for installation of a connection in a lined conduit, they require external access to the connection joint. Accordingly, it is desirable to provide an improved method and apparatus to reinstate a connection internally to avoid the need to excavate at each connection.

SUMMARY OF THE INVENTION

Generally speaking, in accordance with the invention, a method of internally reinstating flow to a connection in a lined conduit and internally sealed connection is provided. An opening is formed in the liner at the location of the connection and a T-nut having a tubular portion with a head at one end is installed into the connection with a sealing gasket about the T-nut shaft to reinstate the connection and hold the liner in place. The T-nut may be installed by providing the tubular portion with a self-tapping thread, or a knurled surface for force fitting into the existing connection, or be screwed into a thread that has been formed in the connection.

An apparatus for internally reinstating flow to the connection constructed and arranged in accordance with the invention includes a robot of the type used for inspection and to cut lateral connections in lined conduits in the trenchless pipeline rehabilitation art. Such devices are equipped with light, camera and positional cutting devices. The robot has a supporting sled with tracks and at least a positioning motor with a rotatable lift bar, that can be moved axially and rotated. A turntable is mounted to the lift bar and includes a drive mechanism for mounting a T-nut having a drivable shaped in central bore such as a hex drive. The lift bar is positionable to install the T-nut into an existing connection. When installation is completed, the lift bar is raised and turned and the drive is engaged with a T-nut mounted in a bracket adjacent the motor and installed into the next connection. After each T-nut installation, the next available T-nut is picked up by the drive mechanism for installation without having to remove the sled assembly from the pipeline.

Accordingly, it is the object of the invention to provide an improved method for reinstating connections in a lined conduit to create a sealed connection between the connection and the liner.

Another object of the invention is to provide an improved method for internally reinstating a connection in a lined conduit to form a seal on both an interior and exterior sidewalls of the conduit and the connection.

A further object of the invention is to provide an improved method of reinstating a connection in a lined conduit, by cutting a hole in the liner from the inside of the conduit to the inner diameter of the conduit.

Yet another object of the invention is to provide an improved device for internally reinstating a connection in a lined conduit.

Yet a further object of the connection is to provide a T-nut for installing in a connection to restore service.

Still other objects and advantages of the invention will in part be obvious and will in part be apparent from the specification.

The invention accordingly comprises the several steps and the relation of one or more of such steps with respect to the others and the apparatus embodying features of construction, combinations of elements and arrangement of parts which are adapted to effect such steps, all of which are exemplified in the detailed disclosure and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
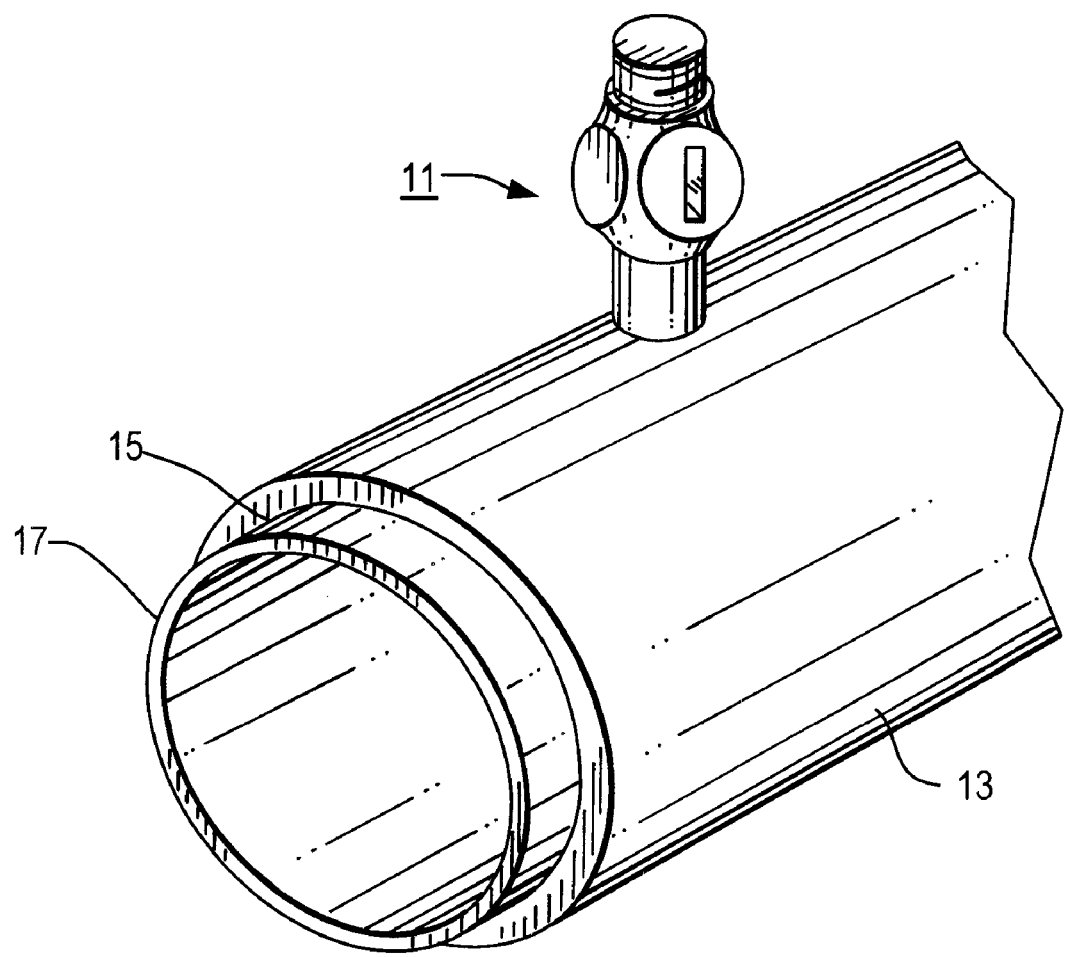
FIG. 1 is a perspective view of a segment of a lined fluid-carrying conduit having a corporation stop installed on the fluid carrying conduit as arranged in accordance with the invention.

FIG. 1 shows a corporation stop 11 installed on a longitudinally extending host conduit 13. Host conduit or pipe 13 could be, for instance a water main, gas main, sewer pipe, or the like. In this instance, conduit 13 is made of steel and has a generally cylindrical interior sidewall 15 which has been lined with a synthetic liner 17 formed from a cured in place liner or polyolefin, e.g. polyethylene or other similar synthetic lining system.

A well-known process for rehabilitation of existing conduits generally utilizing a flexible liner to be cured in place is the Insituform.® Process described in U.S. Pat. Nos. 4,009,063 and 4,064,211, the contents of which are incorporated herein by reference. Another rehabilitation process known as the NuPipe® Process is described in U.S. Pat. No. 4,867,921 and No. 5,255,624, the contents of which are incorporated here by reference. In this latter process a substantially rigid replacement pipe is installed in a flattened and folded shape, heated and expanded to the shape of the original conduit. Another process for lining conduits familiar to those skilled in the art is diameter reduction, which is described in U.S. Pat. No. 4,923,663, issued to McMillan. Another pipe lining and process is discussed in U.S. Pat. No. 5,934,332 to Rodriguez et al., the content of which are incorporated by reference. This later pipe lining is used in the examples shown herein in the drawings.

Figure 2A:
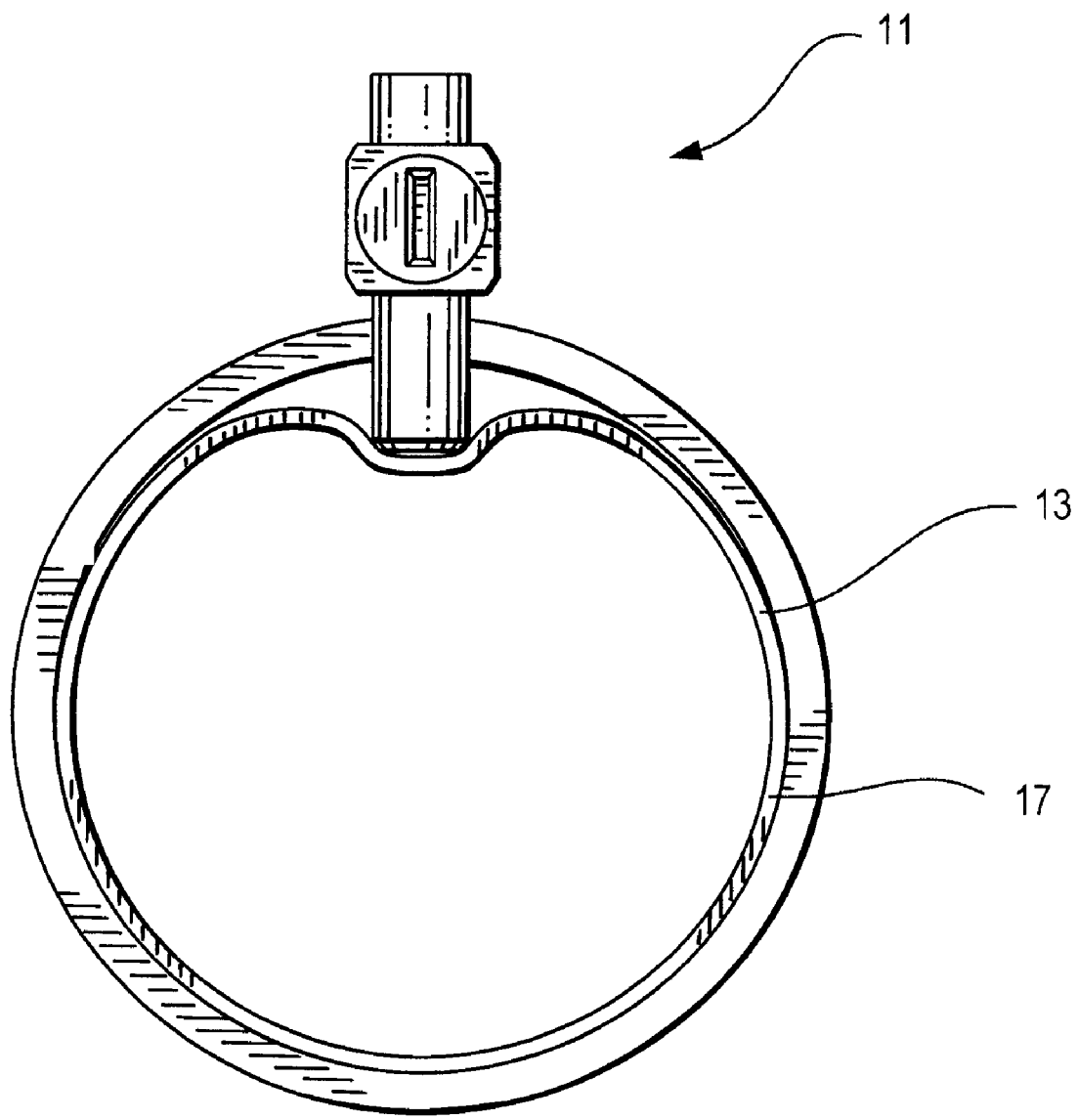
FIG. 2A is a partial cross-section view of the fluid-carrying conduit showing the liner installed in the fluid-carrying conduit of FIG. 1, with a protruding corporation stop.

FIG. 2A shows a partial cross-section view of conduit 13 showing liner 17 installed in conduit 13 with corporation stop 11 that is not entirely connected to conduit 13. Generally, corporation stops usually protrudes into the conduit as shown here. Corporation stop 11 protrudes into conduit 13 and thus makes a depression in liner 17. This depression may be found by inserting a robot into the conduit that has a camera for detecting the locations of the depressions. Once a depression is found, a cutting tool bit may be used by the same robot to form at least one opening in liner 17 at the location of corporation stop 11.

Figure 2B:
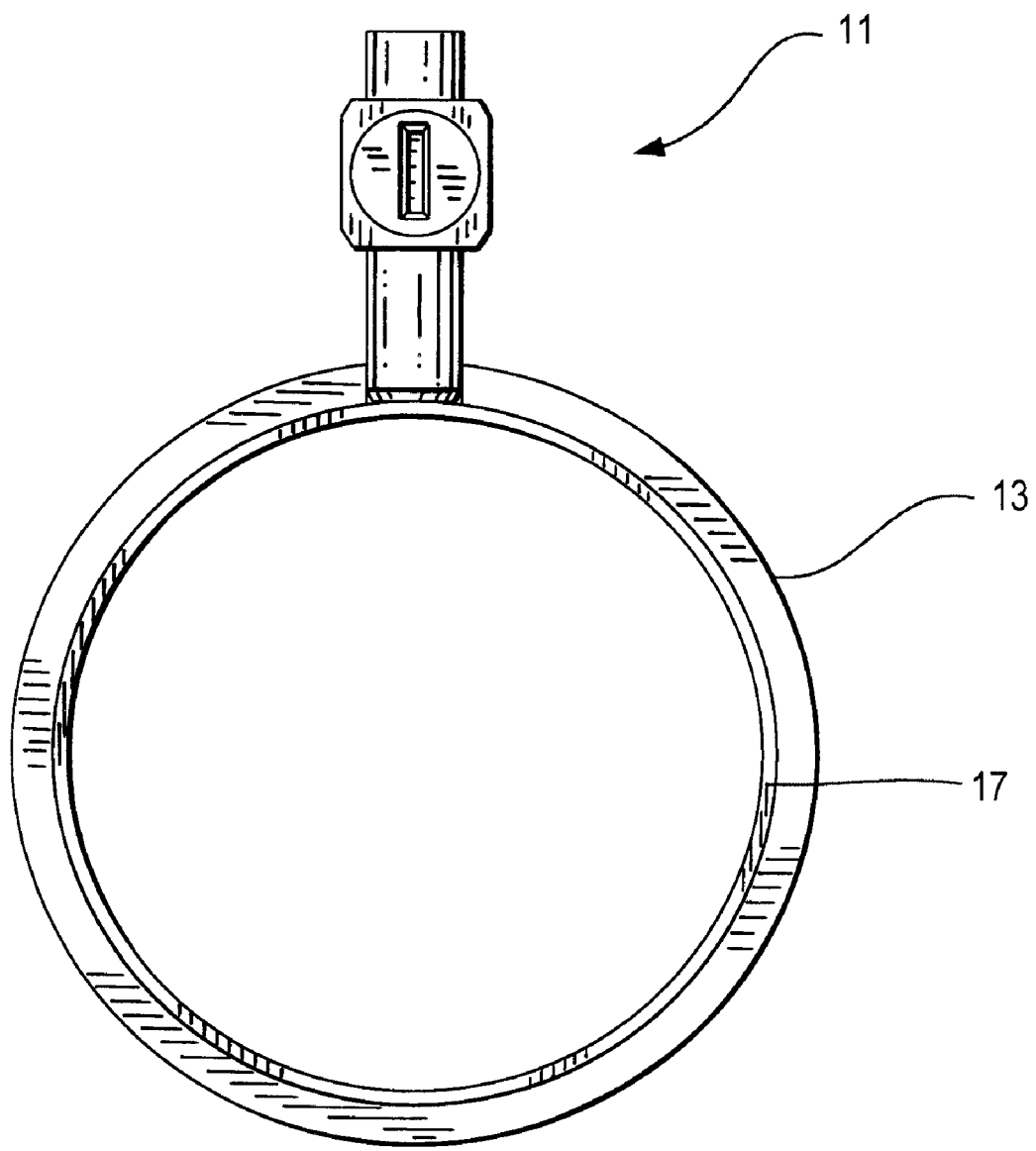
FIG. 2B is another partial cross-section view of the fluid-carrying conduit showing the liner installed in the fluid-carrying conduit of FIG. 1, with a flush corporation stop.

FIG. 2B shows a partial cross-sectional view of conduit 13 showing liner 17 installed in conduit 13 with corporation stop 11 that is not entirely connected to conduit 13 and is not protruding into the conduit 13.

Figure 2C:
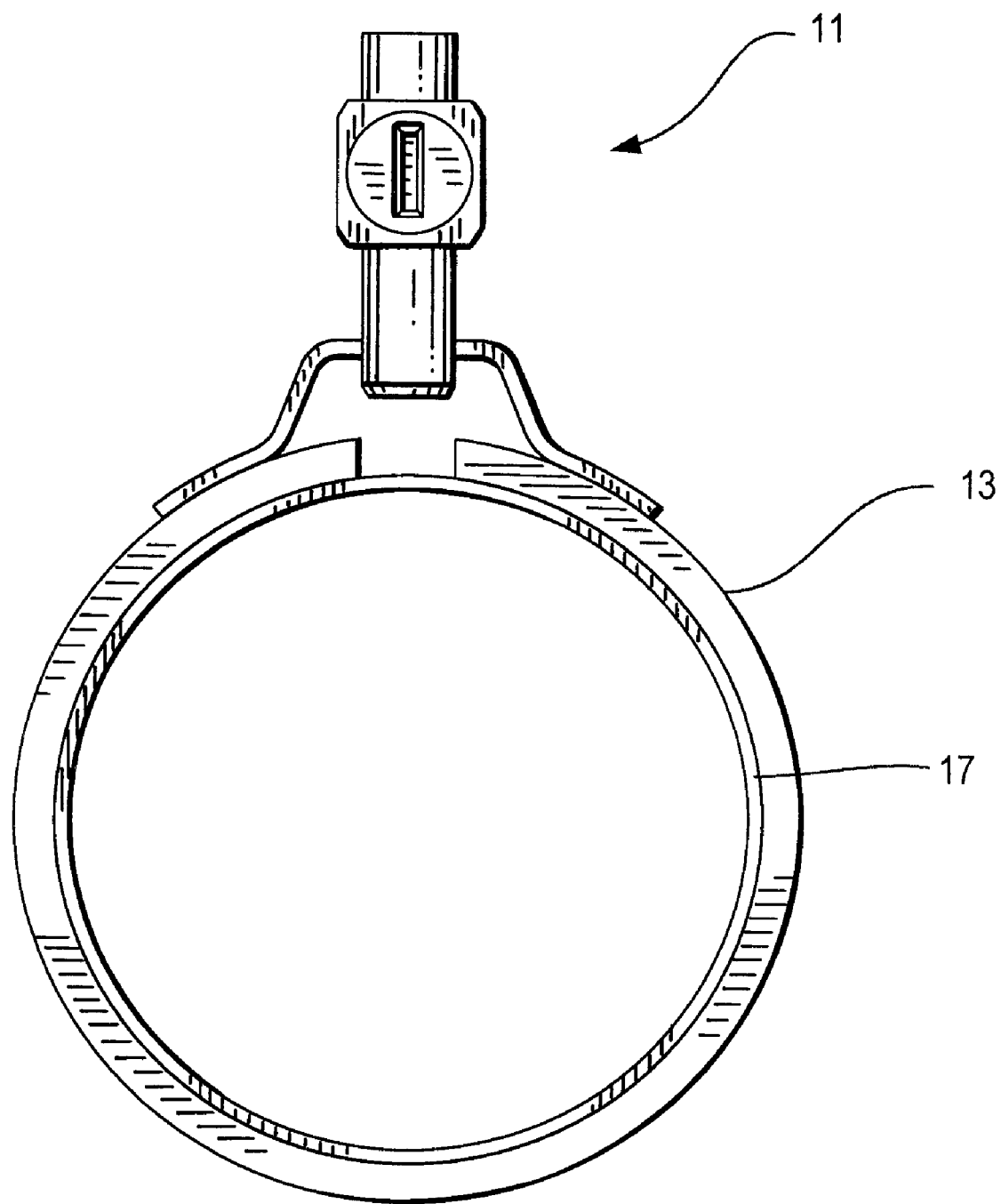
FIG. 2C is another partial cross-section view of the fluid-carrying conduit showing the liner installed in the fluid-carrying conduit of FIG. 1, with a corporation stop mounted within an external saddle attached to the outside wall of the conduit.

FIG. 2C shows a partial cross-sectional view of conduit 13 showing liner 17 installed in conduit 13 with corporation stop 11 that is not entirely connected to conduit 13, is not protruding into the conduit 13 and is attached to an external saddle which is attached to the external wall of the conduit 13. Without a protrusion of corporation stop 11 into conduit 13, there is no visually noticeable depression in liner 17, as well as removing any temporary inserted fittings. Without visual detection, another method of detection using remote sensoring technology, such as eddy current technology, mounted on a robot, can be used for locating the corporation stop. Once a corporation stop is found, a cutting tool bit may be used by the same robot to form at least one concentric opening in liner 17.

Figure 3A:
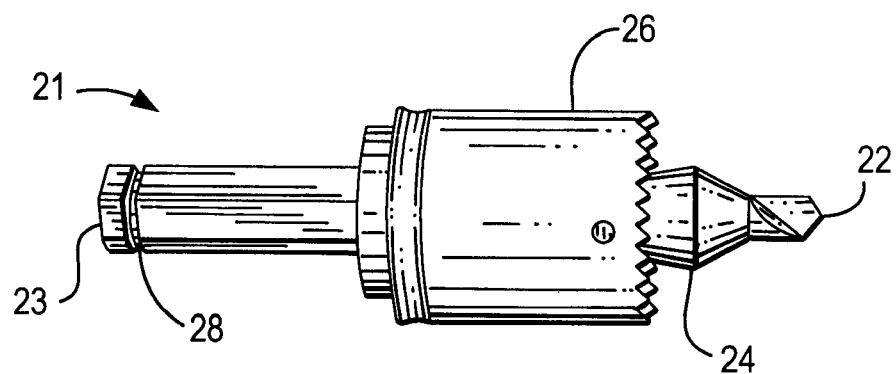
FIG. 3A is a perspective view of a hole saw with centering bit that is used to form two concentric openings in the liner in accordance with the invention.
Figure 3B:
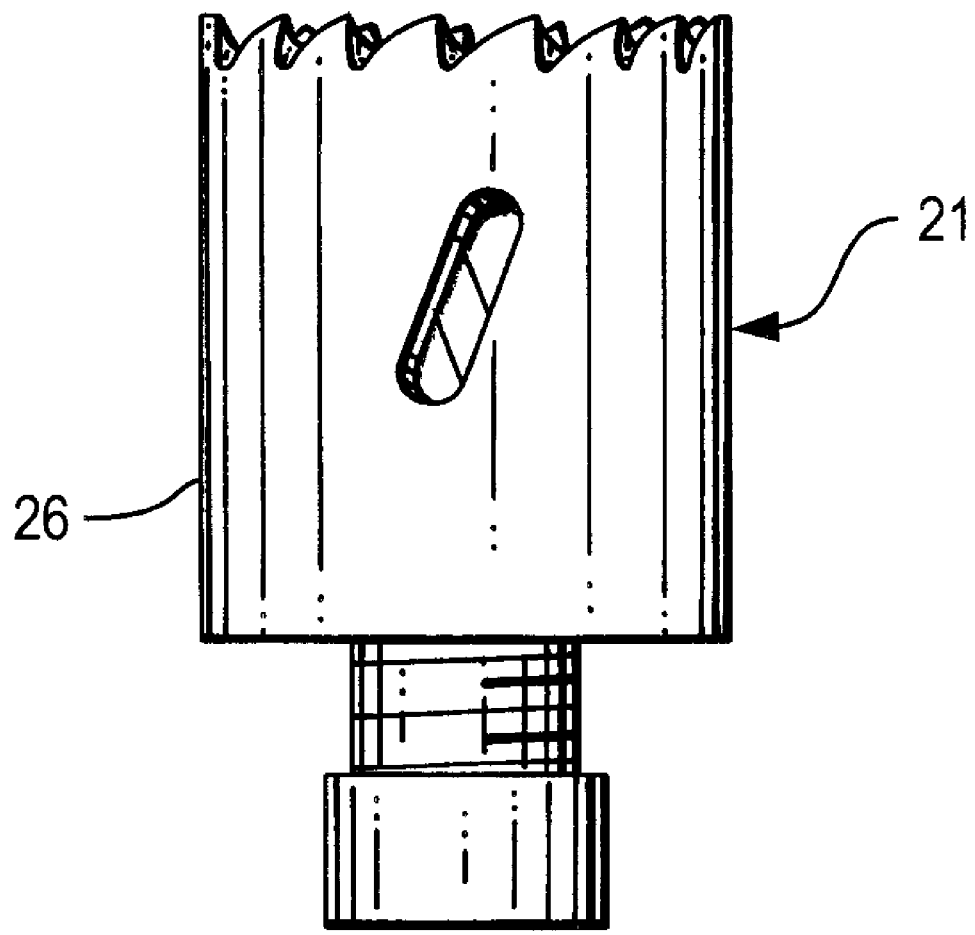
FIG. 3B is a perspective view of a hole saw bit that is used to form one concentric opening in the synthetic liner in accordance with the invention.
Figure 12:
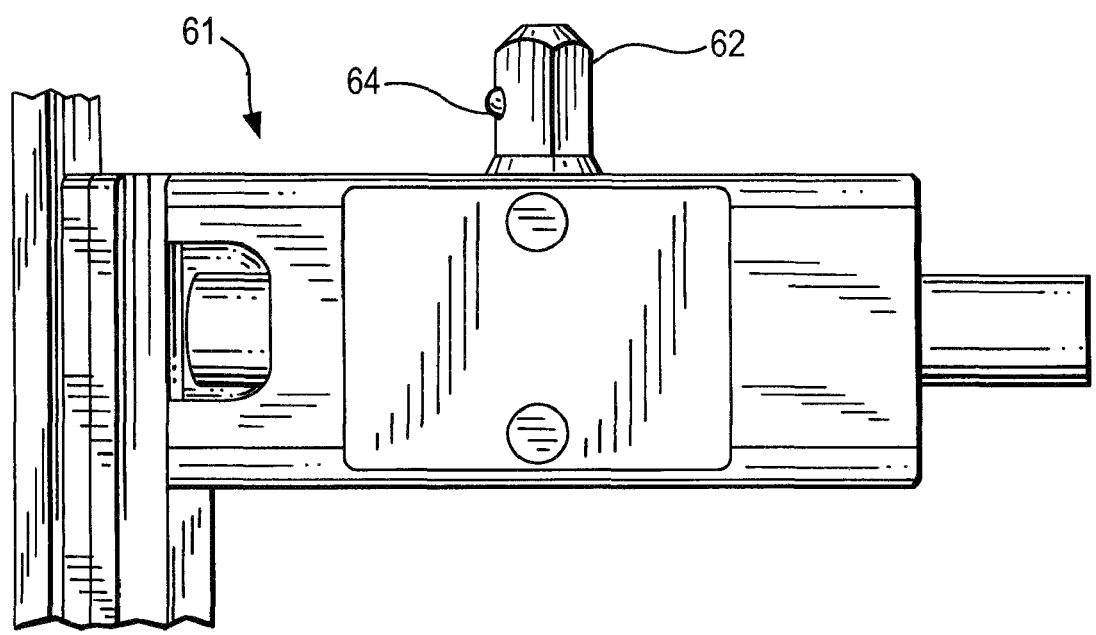
FIG. 12 is a perspective view of a turntable having a removable hex, or other shape, drive in which the bits for making concentric openings in the synthetic liner, for milling the corporation stops, for tapping and for installing T-nuts in accordance with the invention.
Figure 14:
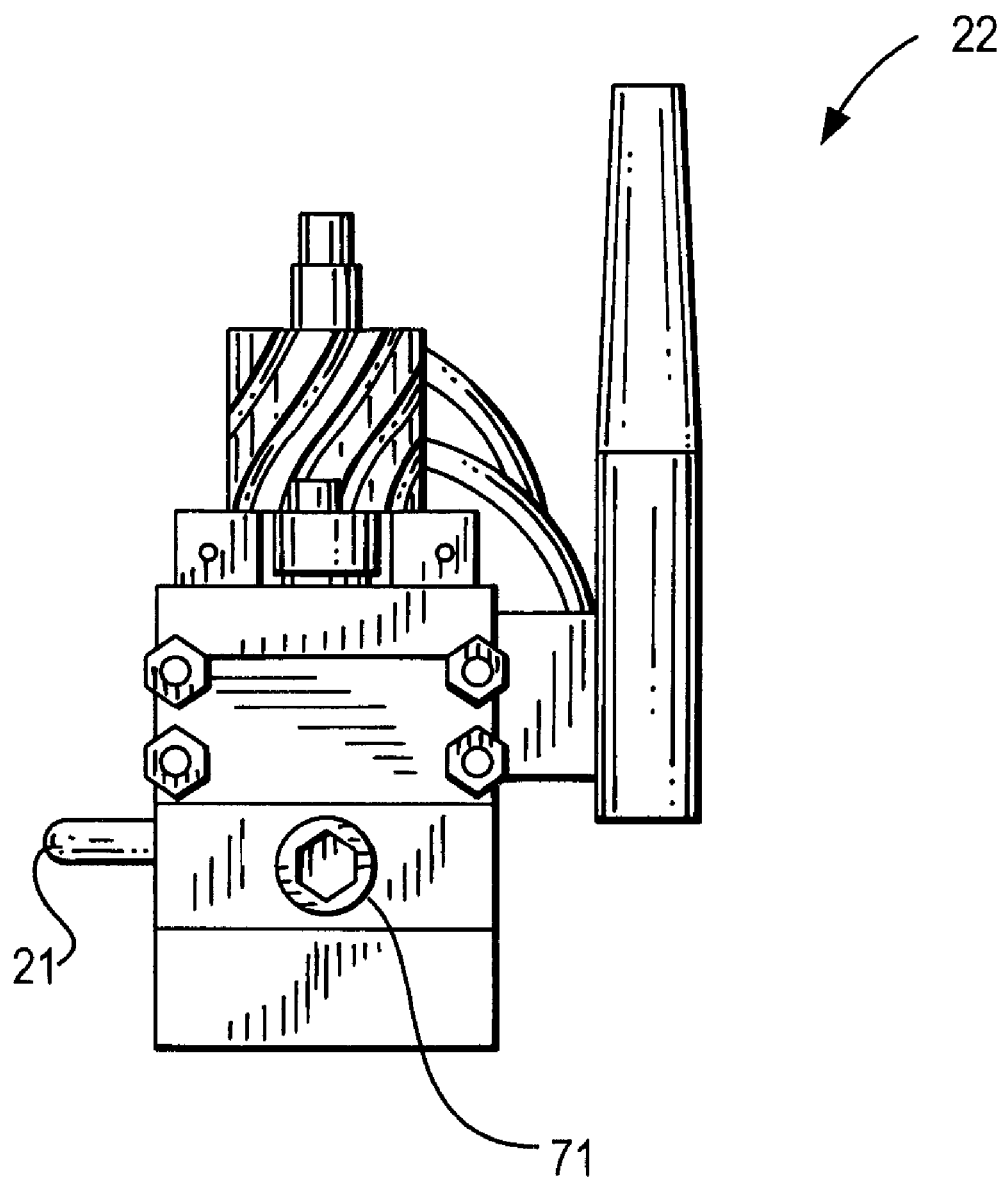
FIG. 14 is an elevational view of an air motor for mounting hole cutting milling bits and remote sensing technology, such as an eddy current probe in a lined conduit.

FIGS. 3A and 3B show respectively a hole saw bit 21 with and without a centering bit 22 and a saw 26 at one end and a hex end 23 at the other end. Centering bit 22 is used to drill a first opening in liner 17 where a outside shoulder 24 of centering bit 22 is sized to the inside diameter of the corporation stop 11. Saw 26 is used to drill a second concentric opening in liner 17 with saw 26 sized to the outside diameter of corporation stop 11. Note that first opening and second concentric opening are drilled around the same time. With no centering bit 22, one larger opening in liner 17 is formed where saw 26 is sized to the outside diameter of corporation stop 11. Hex end 23 of hole saw bit 21 fits into a turntable 61 (shown in FIG. 12) and is secured with a snap ring groove 28. Turntable 61 drives hole saw bit 23. Turntable 61 mounts onto a standard lateral reinstatement cutter 63 which is mounted onto a modified robot. An air motor 71 mounted on a standard lateral reinstatement cutter 63 may act as an alternative method for mounting of cutting devices as shown in FIG. 12 and FIG. 14.

Figure 3C:
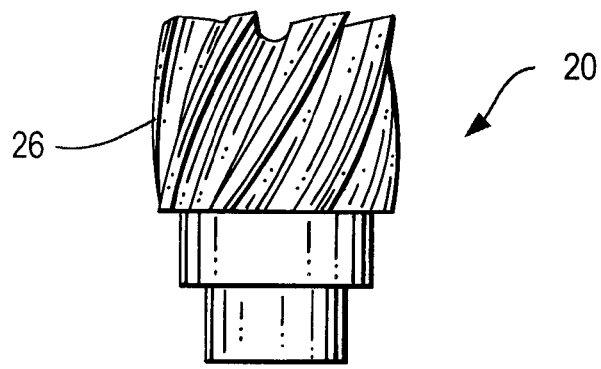
FIG. 3C is a perspective view of a milling bit that is used to form one concentric opening in the synthetic liner in accordance with the invention.
Figure 3D:
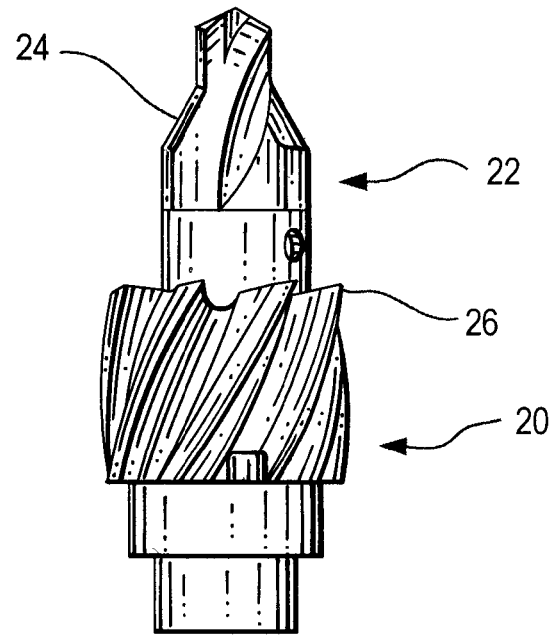
FIG. 3D is a perspective view of a milling bit with centering bit that is used to form two concentric openings in the liner in accordance with the invention.

FIGS. 3C and 3D shows milling bit 20 with and without a centering bit 25 at one end. Centering bit 25 is used to drill a first opening in liner 17 where outside shoulder 24 of centering bit 25 is sized to the inside diameter of corporation stop 11. Milling bit 20 is used to mill a second concentric opening in liner 17 where milling bit 20 is sized to the outside diameter of corporation stop 11. Note that first opening and second concentric opening are performed around the same time. With no centering bit 25, one opening in liner 17 is formed where milling bit 20 is sized to the outside diameter of corporation stop 11. Air motor 71 mounted on a standard lateral reinstatement cutter acts as the method for mounting of cutting devices as shown in FIG. 14. Alternatively, a hex end of milling bit 20 fits into turntable 61 and is secured with a snap ring groove 28. Turntable 61 drives the milling bit 23. Turntable 61 mounts onto standard lateral reinstatement cutter 63 which is mounted onto a modified robot.

Figure 3E:
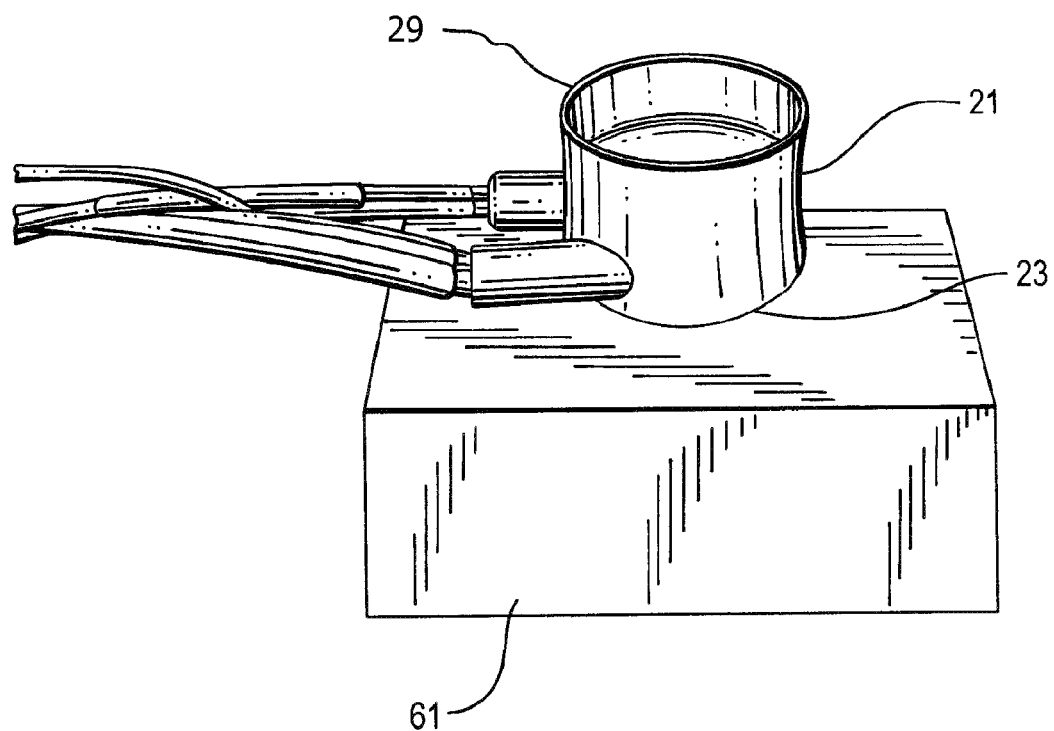
FIG. 3E is a perspective view of a heated hole cutting bit that is used to form one concentric opening in the synthetic liner in accordance with the invention.
Figure 3F:
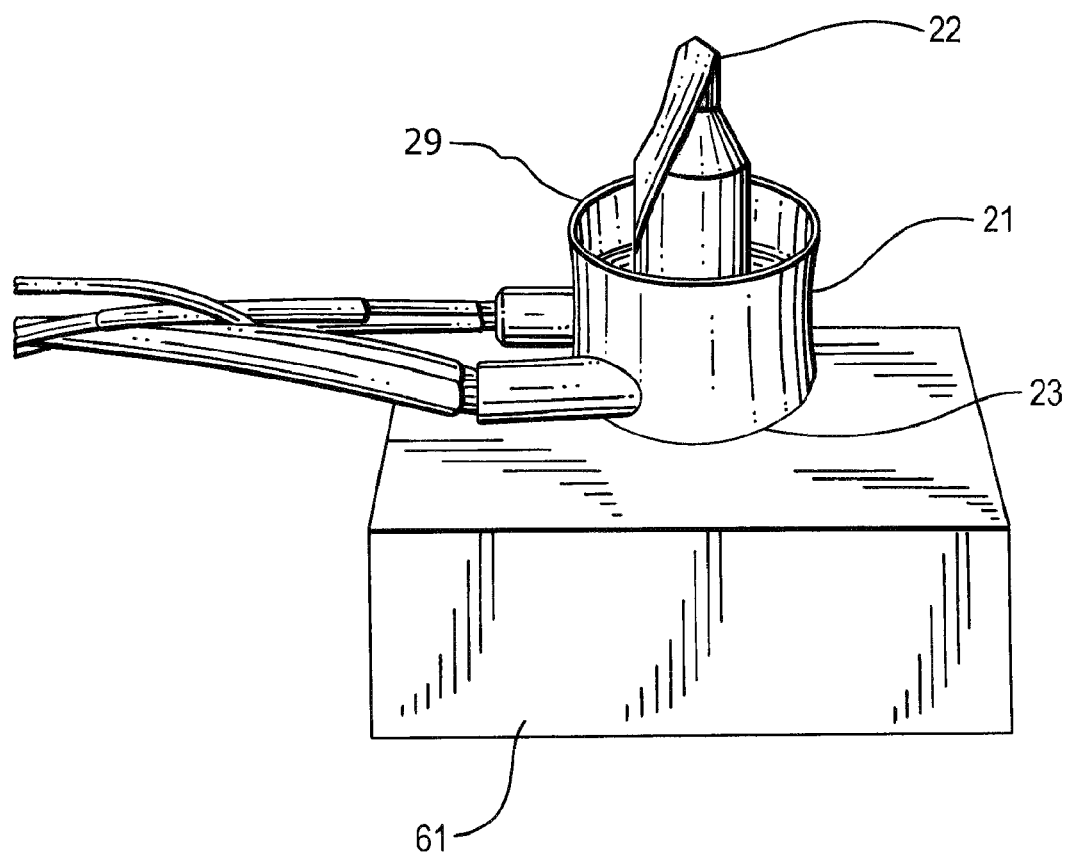
FIG. 3F is a perspective view of a heated hole cutting and centering bit that is used to form two concentric openings in the synthetic liner in accordance with the invention.

FIGS. 3E and 3F respectively show a heated hole cutting bit 29 with and without a centering bit 22 at one end and a hex end 23 at the other end. Centering bit 22 is used to burn a first opening in liner 17 where outside shoulder 24 of centering bit 22 is sized to the inside diameter of corporation stop 11. A heated hole cutter 29 is used to burn a second concentric opening in liner 17 where heated cutter 29 is sized to the outside diameter of corporation stop 11. First opening and second concentric opening are performed around the same time. With no centering bit 22, one opening in liner 17 is formed where heated hole cutter 22 is sized to the outside diameter of corporation stop 11. Hex end 23 of heated hole cutter bit 21 fits into turntable 61 and is secured with a snap ring groove 28. Turntable 61 drives the heated hole cutter bit 23. Turntable 61 mounts onto a standard lateral reinstatement cutter 63 which is mounted onto a modified robot as shown in FIG. 12.

Figure 4:
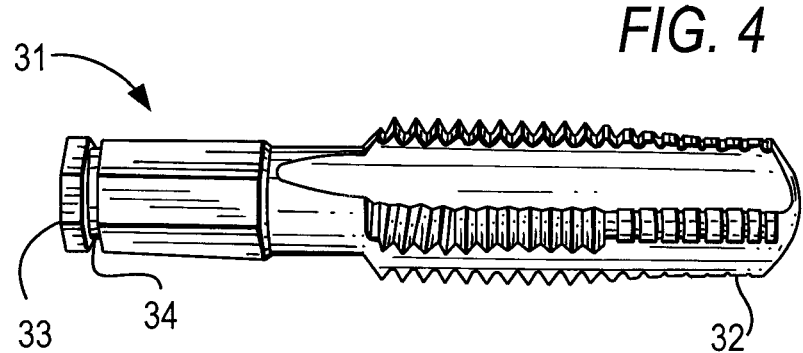
FIG. 4 is a perspective view of a self-aligning tap for forming an internal thread in the corporation stop in accordance with the invention.
Figure 3G:
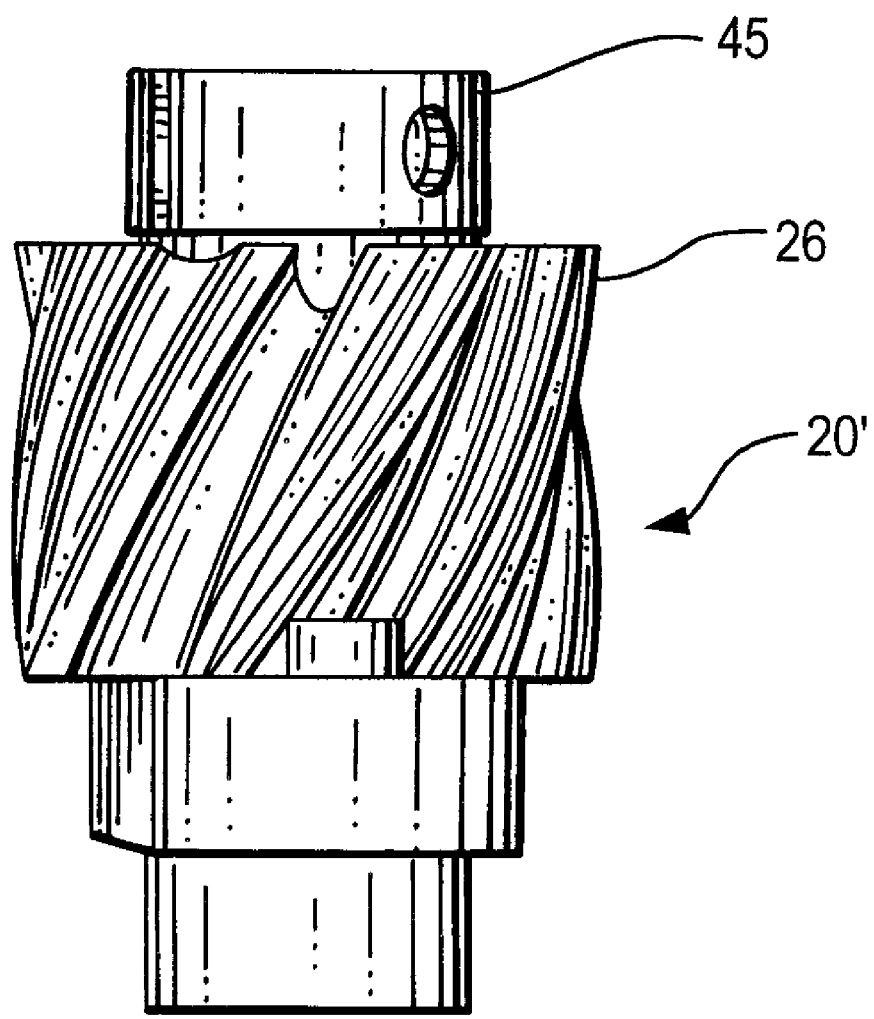
FIG. 3G is a perspective view of a milling bit with a bearing end used to remove the protrusion of a corporation stop before liner insertion in accordance with the invention.

FIG. 3G shows a perspective view of a milling bit 20' with a bearing end 45 used to remove the protrusion of corporation stop 11 before liner insertion. Referring now to FIG. 4, a tap 31 having a self-aligning pilot end 32 and a hex end 33 is shown. Hex end 33 of tap 31 fits into turntable 61 (See FIG. 12) and is secured with a snap ring groove 34. Tap 31 is used to thread the inner bore of corporation stop 11. The threads formed are left hand threads so as not to loosen corporation stop 11 during the tapping with tap 31 or installation of T-nut 36. Pilot end 32 is sized to the inside diameter of the corporation stop 11 and the end of the pilot end 32 is sharpened to remove material or scale if needed. Tap threading is not applicable if a self-tapping T-nut 36 is used.

Figure 5A:
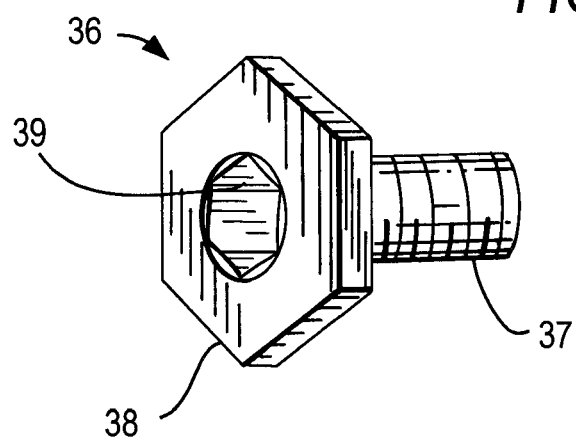
FIG. 5A is a perspective view of a self-tapping T-nut that is screwed into the corporation stop in accordance with the invention.

FIG. 5A shows a self-tapping T-nut 36 that is to be screwed into corporation stop 11. Self-tapping T-nut 36 has a tubular or pilot end 37 and a hex end 38. Pilot end 37 is sized to the inside diameter of the corporation stop 11 to guide it straight and to prevent cross threading. Hex end 38 has a broached hex opening 39 in the center. When using self-tapping T-nut 36, corporation stop 11 does not need to be threaded because self-tapping T-nut 36 makes its own thread. Preferably, the thread is coarse to prevent stripping around and the thread design is about 10 degrees and the thread profile is narrow such that self-tapping may be achieved in corporation stop 11 with unknown or varying internal bore diameter. Threads are left hand threads so as not to loosen corporation stop 11 during installation of self-tapping T-nut 36. Self-tapping T-nut 36 can be driven into corporation stop 11 by the outside perimeter of hex end 38 or can be driven into corporation stop 11 by a broached hex opening 39 in the inner diameter of hex end 38. T-nut 36 is removable for either robotically from inside the liner 17 or from outside by access thru the corporation stop 11 inner bore. T-nut 36 can be made with no flow-thru in the case where a blind connection is required (e.g., abandoned connections).

Figure 5B:
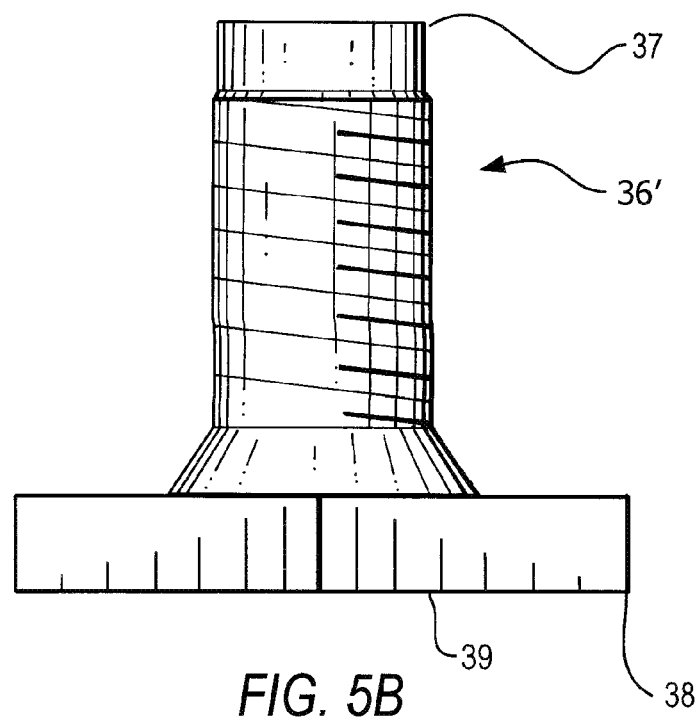
FIG. 5B is a perspective view of a threaded T-nut with straight thread that is screwed into the corporation stop in accordance with the invention.
Figure 5C:
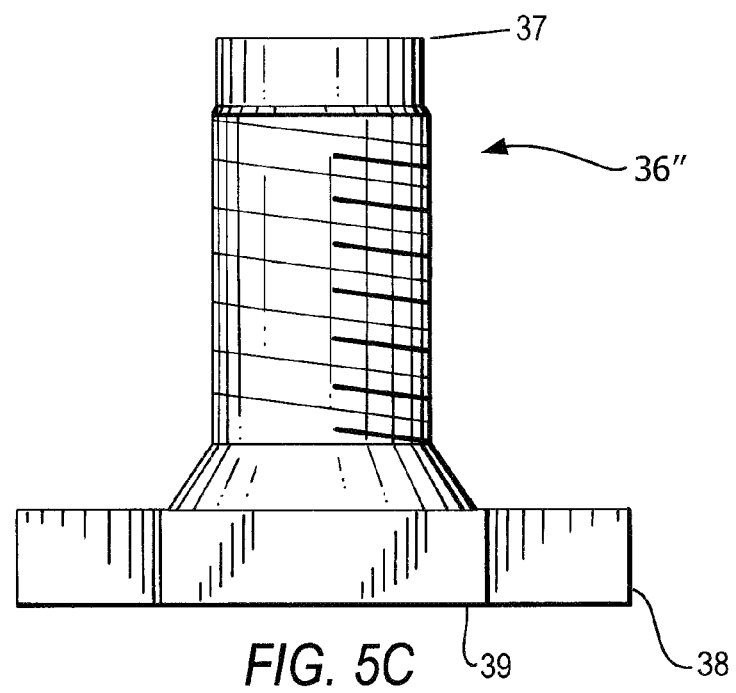
FIG. 5C is a perspective view of a threaded T-nut with tapered thread that is screwed into the corporation stop in accordance with the invention.

FIG. 5B shows a standard straight threaded (not self-tapping) T-nut 36' that is to be screwed into corporation stop 11. FIG. 5C shows a standard tapered T-nut 36" that is to be screwed into corporation stop 11. The threaded T-nuts have a pilot end 37 and a hex end 38. Pilot end 37 is sized to the inside diameter of corporation stop 11 to guide it straight and to prevent cross threading. Hex end 38 has a broached hex opening 39 in the center. When using T-nut 36, corporation stop 11 must be previously threaded with tap 31. Threads are left hand threads so as not to loosen corporation stop 11 during tapping with tap 31 or installation of T-nut 36. T-nut 36 can be driven into corporation stop 11 by the outside perimeter of hex end 38 or can be driven into corporation stop 11 by a broached hex opening 39 in the inner diameter of hex end 38. T-nut 36 is removable for repair either robotically from inside the liner 17 or from outside by access thru the corporation stop 11 inner bore. T-nut 36 can be made with no flow-thru in the case where a blind connection is required (e.g., abandoned connections).

Figure 5D:
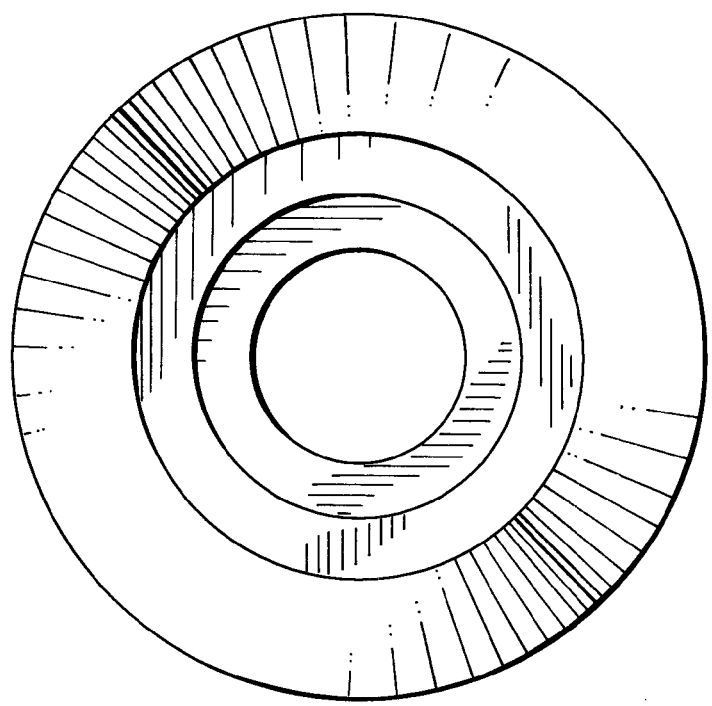
FIG. 5D is a perspective view of a sealing gasket which is placed around the shaft of a T-nut and screwed into the corporation stop in accordance with the invention.
Figure 5E:
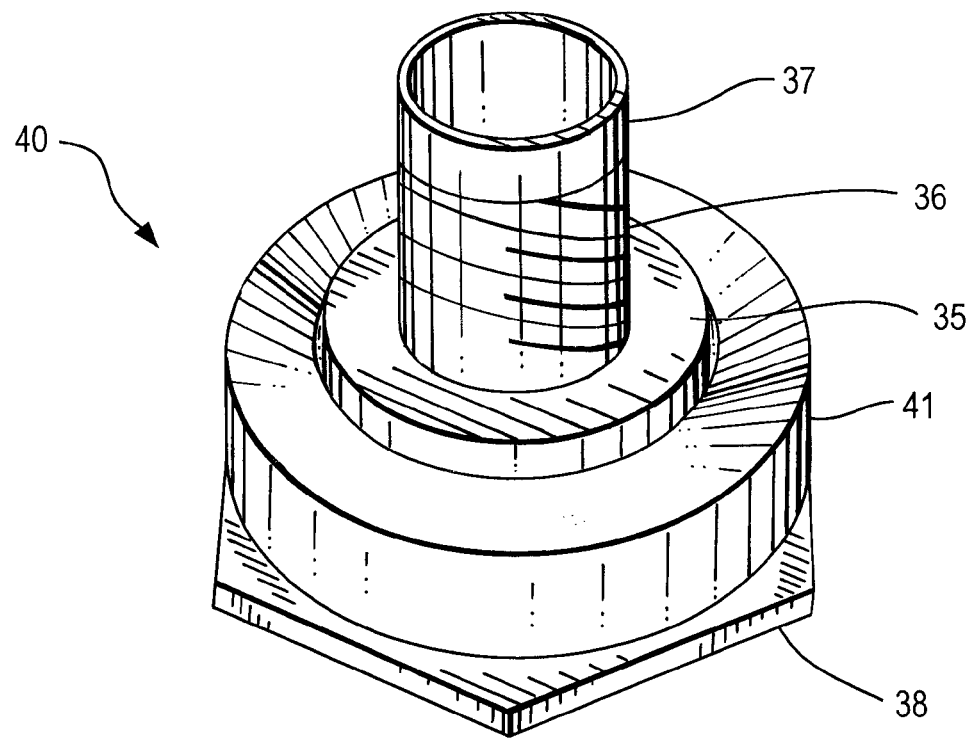
FIG. 5E is a perspective view of a T-nut assembly including a sealing gasket and sealing washer, which is screwed into the corporation stop in accordance with the invention.
Figure 5F:
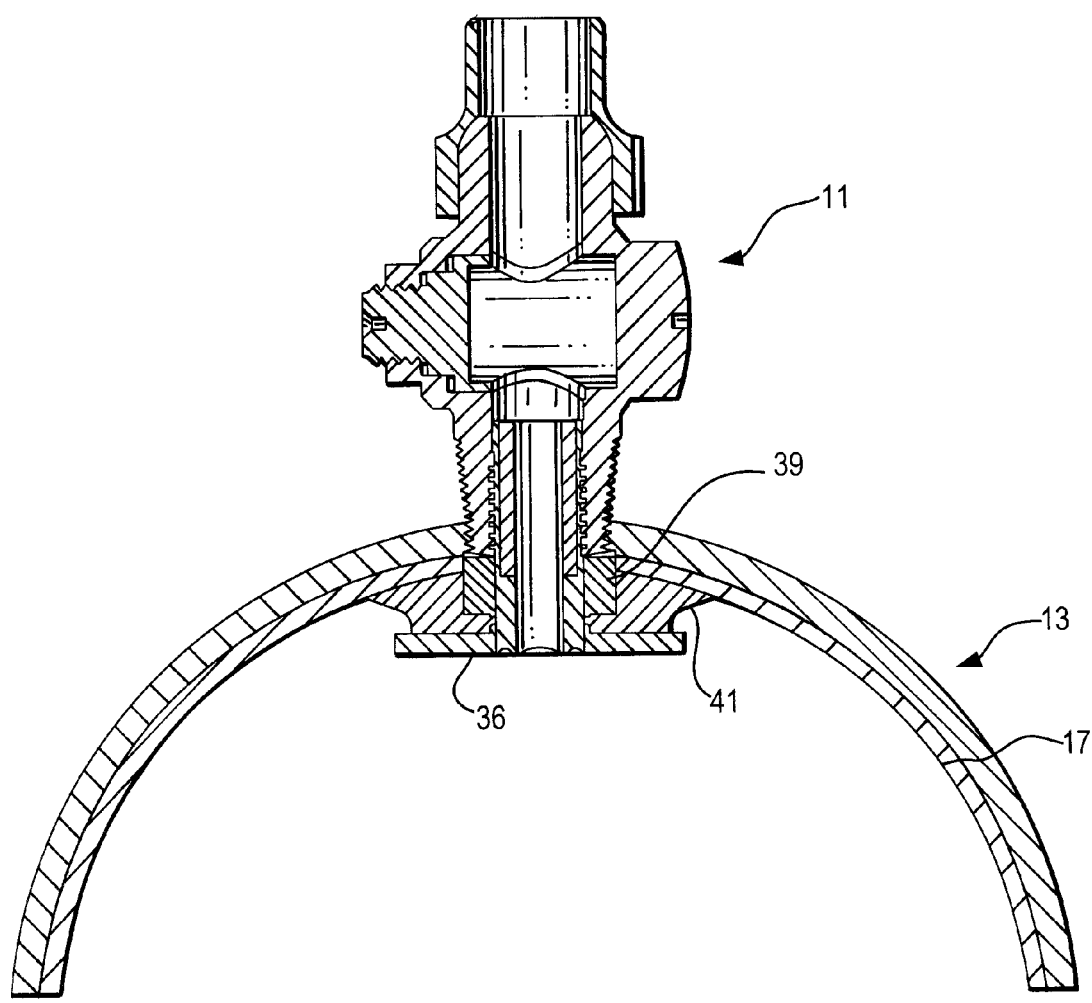
FIG. 5F is a cross-sectional view of the fluid-carrying conduit with liner and reinstated corporation stop in accordance with the invention.

FIG. 5D is a perspective view of a sealing gasket 41 which is placed around the shaft of a T-nut and screwed into the corporation stop 11. FIG. 5E shows a perspective view of a T-nut assembly 40 with a sealing gasket 41 and a rigid sealing washer 35 placed around pilot end 37 of T-nut 36 and screwed into corporation stop 11. Sealing gasket 41 can be any suitable gasket material acceptable for the fluid carried in the conduit, such a rubber or a compressible synthetic material. Preferably, gasket 41 is an EPDM rubber or other suitable elastomeric sealing material. FIG. 5F is a perspective view cross section of a T-nut assembly with sealing gasket 41 and sealing washer 39 in a lined conduit with the T-nut assembly installed in corporation stop 11.

Figure 6:
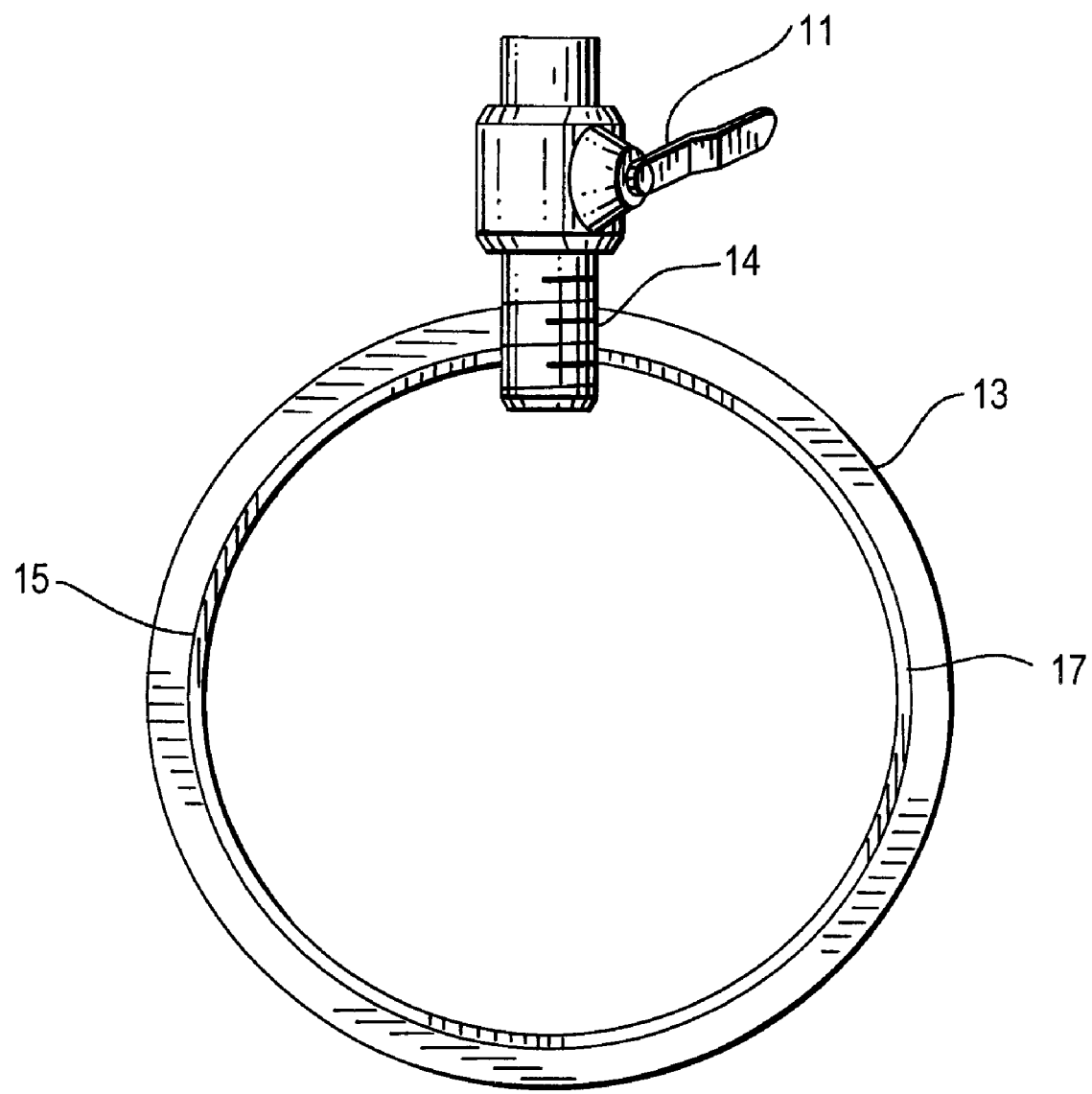
FIG. 6 is a view similar to FIG. 2 showing a concentric opening in the liner at the start of forming a internally sealed connection between the corporation stop and the synthetic liner.
Figure 7:
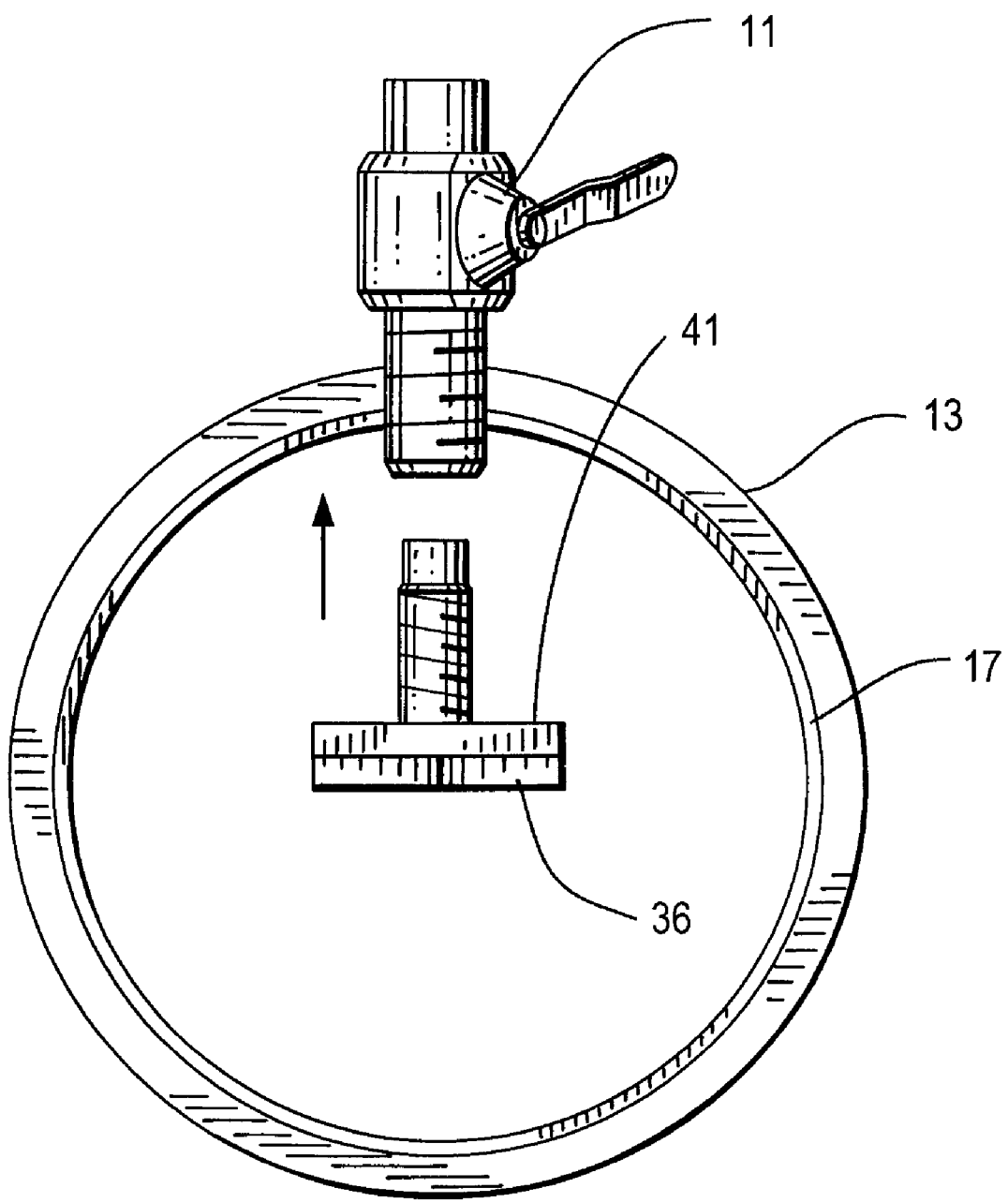
FIG. 7 is a view similar to FIG. 6 showing a T-nut and a sealing gasket about be inserted within the opening in the synthetic liner and corporation stop in accordance with the invention.
Figure 8:
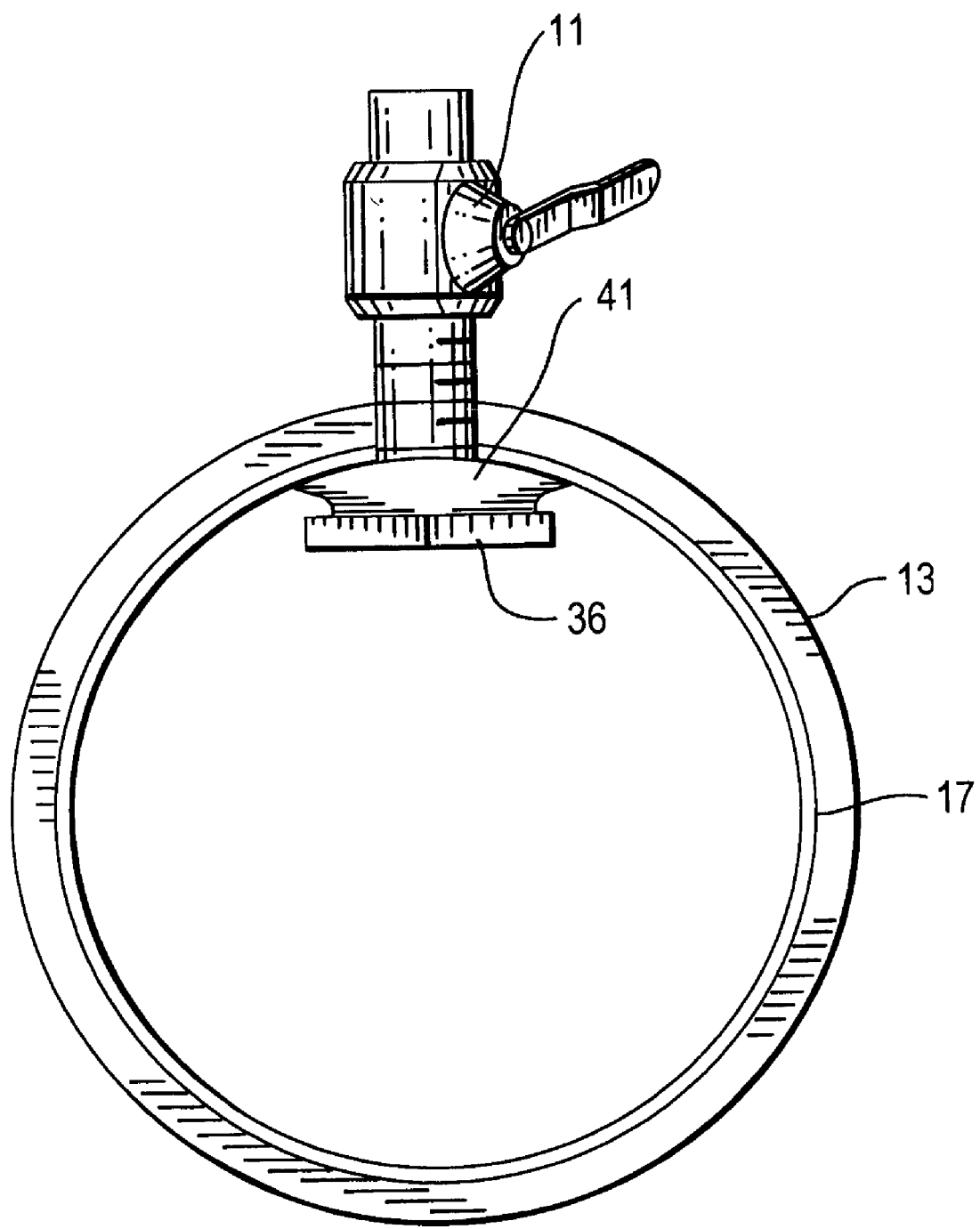
FIG. 8 is a view similar to FIG. 7 showing the installed internal tap constructed and arranged in accordance with the invention that achieves a seal between the corporation stop and the synthetic liner.

FIGS. 6-8 illustrate the installation of a sealed connection in corporation stop 11 within an opening provided in liner 17. Liner 17 is impermeable to water and air.

FIG. 6 shows an opening 14 in liner 17 at the start of forming an internally sealed connection between corporation stop 11 and liner 17. FIG. 7 illustrates self-tapping T-nut 36 and sealing gasket 41, with or without sealing washer 35, about be inserted within opening 14 in liner 17 and corporation stop 11. Sealing gasket 41 and hex end 38 of T-nut 36 pushes against liner 17 and makes a sealed connection at liner 17 to the conduit as shown in FIG. 8. Here, the internal connection fully forms an internally sealed connection between corporation stop 11 and liner 17. Generally, once self-tapping T-nut 36 is installed in liner 17 it makes a mechanical locking point and holds liner 17 in place.

In the case where the T-nut used is not self tapping, tap 31 is used to thread corporation stop 11 as shown in FIG. 4. Pilot end 32 is sized to the inside diameter of the corporation stop 11 and the end of pilot end 32 is sharpened to remove material or scale if needed. After corporation stop 11 is threaded, the installation of T-nut 36 in corporation stop 11 within an opening provided in liner 17 can proceed as shown in FIGS. 6-8. T-nut 36 is screwed with a sealing gasket 41 facing liner 17 into corporation stop 11 forming an internally sealed connection between corporation stop 11 and liner 17.

Figure 9:
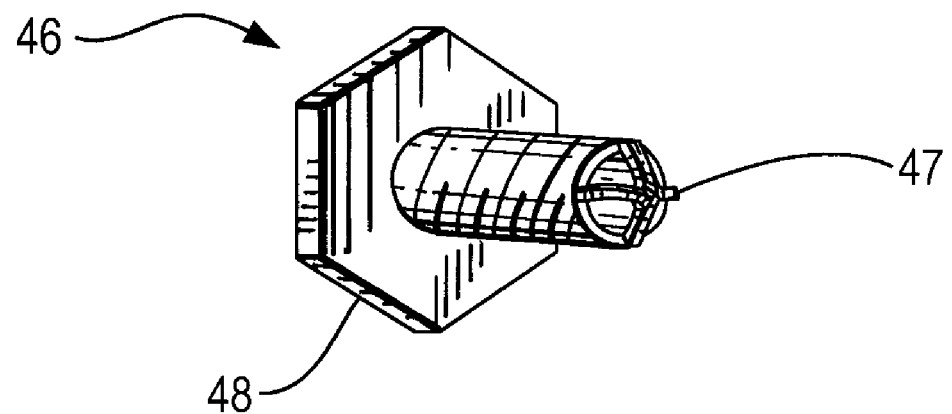
FIG. 9 is a perspective view of a self-tapping T-nut with a drilling bit on the pilot end that is used to form the concentric opening in the liner in accordance with another embodiment of the invention.

In FIG. 9, another type of T-nut is shown called a drill bit self-tapping T-nut 46 that is to be screwed into corporation stop 11. Self-tapping T-nut 46 has a drill bit pilot end 47 and a hex end 48. Drill bit pilot end 47 is sized to the inside diameter of corporation stop 11 to guide it straight and drills an opening directly into liner 17 to prevent cross threading. In addition, drill bit pilot end 47 threads corporation stop 11 and seals against liner 17. Hex end 48 has a broached hex 49 (not shown) in the center. Preferably, the thread is coarse to prevent stripping around and the thread design is about 10 degrees. Self-tapping T-nut 46 can be driven into corporation stop 11 by the outside perimeter of hex end 48 or can be driven into corporation stop 11 by a broached hex 49 in the inner diameter of hex end 48.

Figure 10:
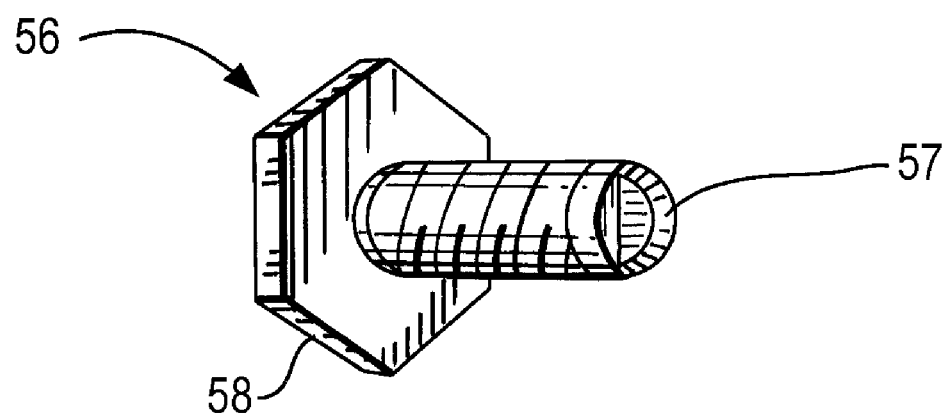
FIG. 10 is a perspective view of a self-tapping T-nut with a punching bit on the pilot end that is used to form the concentric opening in the liner in accordance with further embodiment of the invention.

Another type of T-nut is shown called a punch bit self-tapping T-nut 56 that is to be screwed into the corporation stop 11 is shown in FIG. 10. Self-tapping T-nut 56 has a punch bit pilot end 57 and a hex end 58. Punch bit pilot end 57 is sized to the inside diameter of the corporation stop 11 to guide it straight and punches an opening directly into liner 17 to prevent cross threading. In addition, punch bit pilot end 57 threads corporation stop 11 and seals against liner 17. Hex end 58 has a broached hex 59 (not shown) in the center. Preferably, the thread is coarse to prevent stripping around and the thread design is about 10 degrees. Self-tapping T-nut 56 can be driven into corporation stop 11 by the outside perimeter of hex end 58 or can be driven into corporation stop 11 by a broached hex 59 in the inner diameter of hex end 58.

Figure 19:
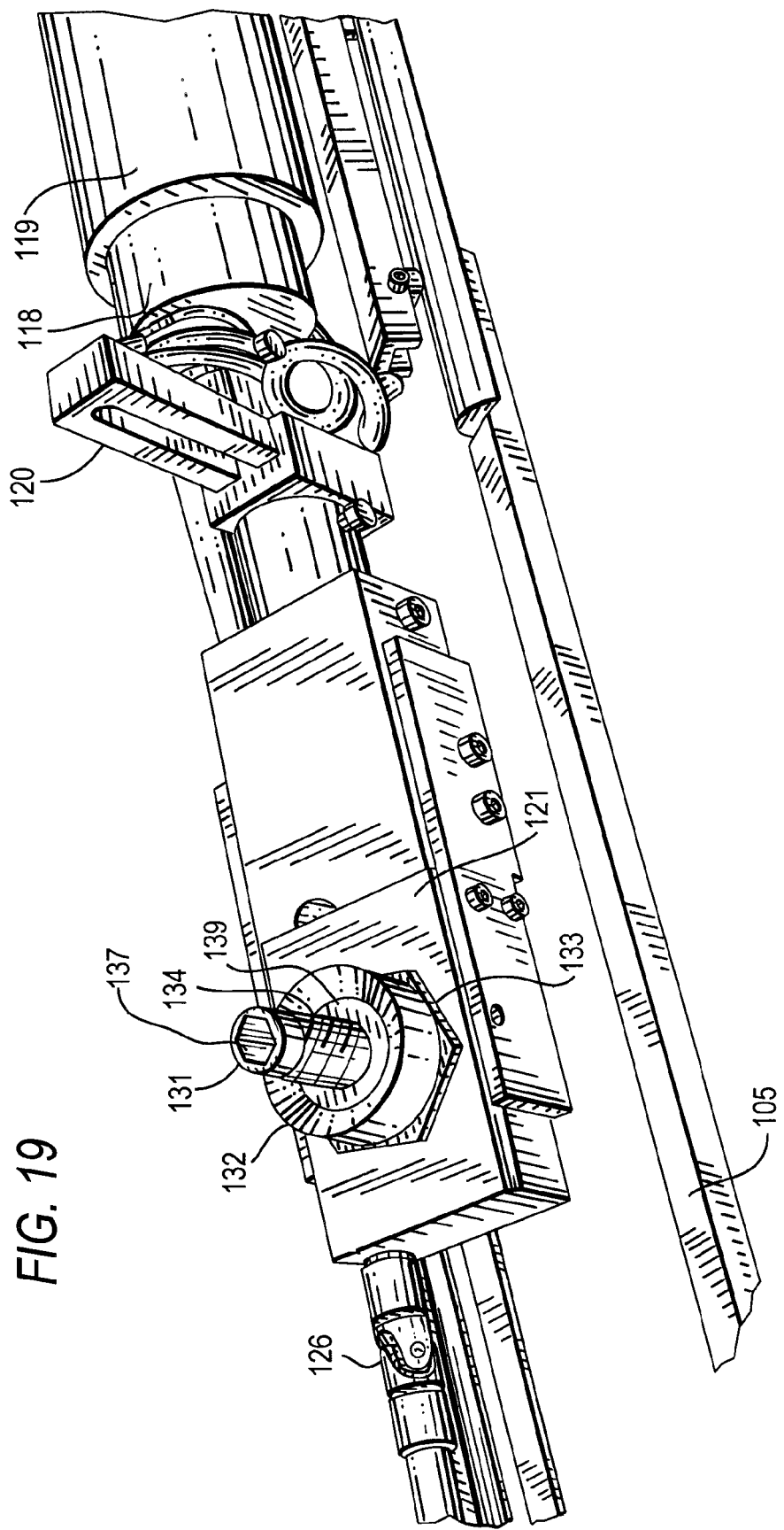
FIG. 19 is a perspective view of the turntable with a mounted T-nut and robot with lift of the tapping assembly of FIG. 17.

When using drill bit self-tapping T-nut 46 or punch bit self-tapping T-nut 56, the initial hole in liner 17 is form by the drill bit T-nut 46 or punch bit T-nut 56 while threading the corporation stop and sealing the liner simultaneously. In this case a sealing washer 39 or 139 shown in FIGS. 5F and 19 is used with T-nut 36 as shown in FIG. 5F. When corporation stop is threaded, sealing washer 39 or 139 is not essential as the threads on T-nut 37 can be wrapped with Teflon tape to form a seal.

Figure 11:
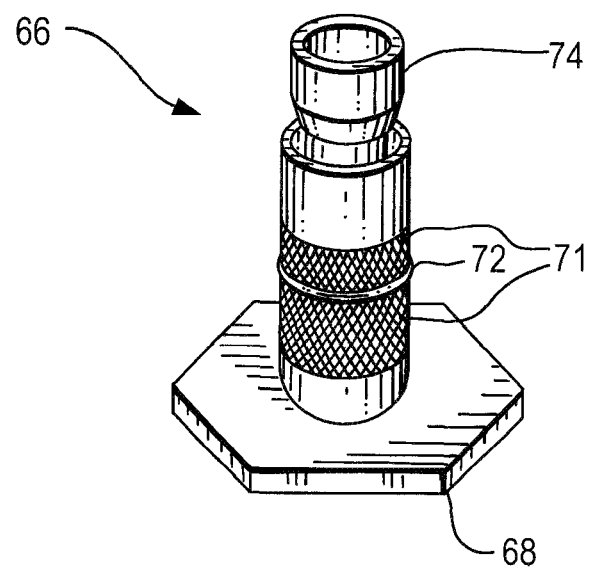
FIG. 11 is a perspective view of a T-nut with a knurled body and an o-ring seal with an internal swage nut that helps guide the T-nut in the inner diameter of the corporation stop in accordance with another embodiment of the invention.

In FIG. 11 another type of T-nut is shown called a compression T-nut 66 that is to be placed into corporation stop 11. Here, compression T-nut 66 has a knurled body 71, an O-ring seal 72 and an internal swage nut (not shown) that swages the body of compression self-tapping T-nut 66 against the inner diameter of corporation stop 11. A threaded rod or bolt 74 is inserted into compression T-nut 66 before installation and is drawn tight causing the swage nut to swage the body of compression fit T-nut 66 outward and is swaged into place. Threaded rod 74 is then removed and the robot is reloaded for another placement of the next compression fit T-nut 66.

In all of the different T-nuts shown, a sealing gasket 41 preferably is used for sealing liner 17 against conduit 11, with or without sealing washer 39.

Figure 13:
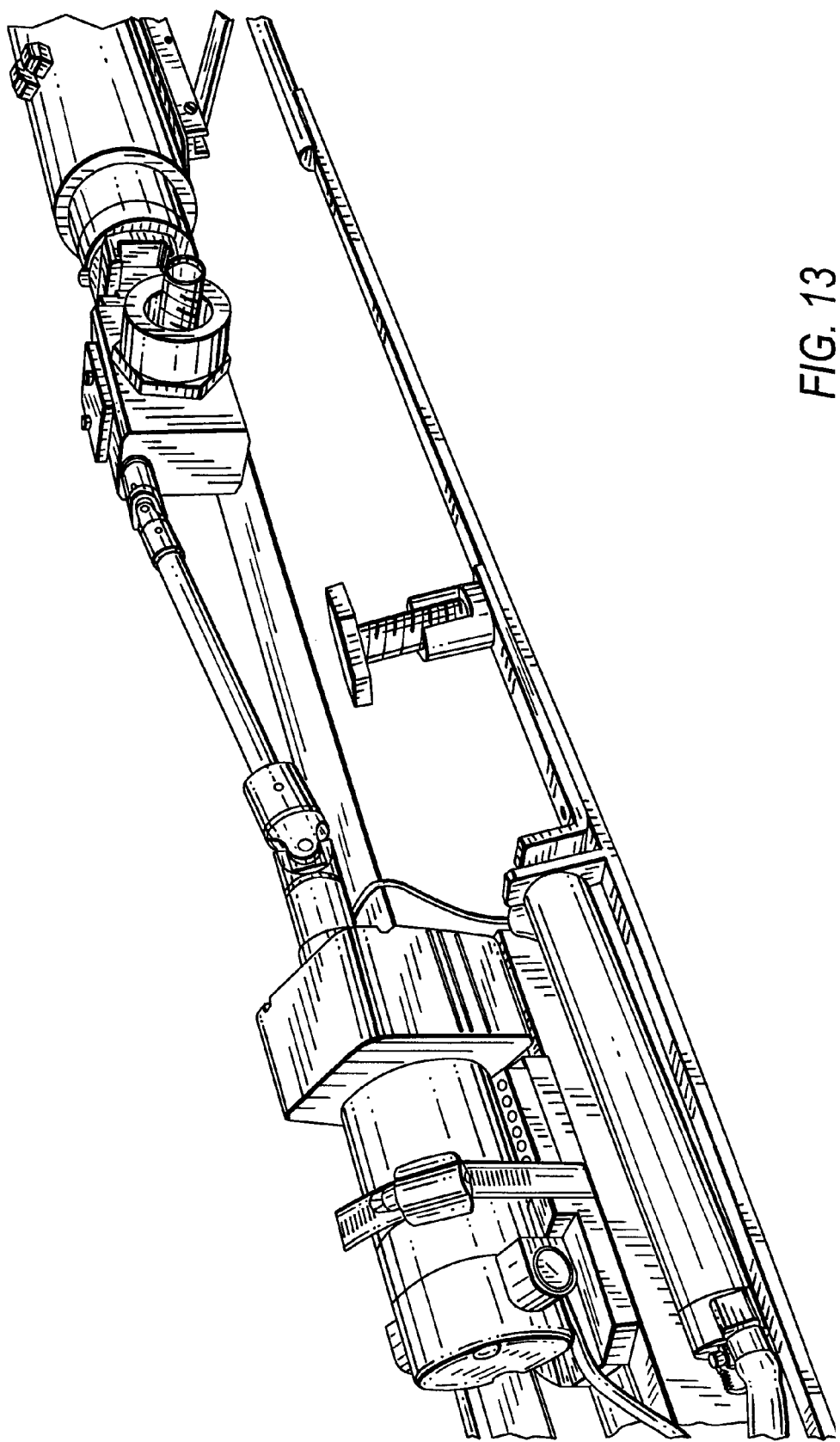
FIG. 13 is a perspective view of an automatic T-nut loader constructed and arranged in accordance with the invention.

FIG. 12 shows turntable 61 that has hex drive 62 that is removable. Turntable 61 mounts onto the standard lateral reinstatement cutter 63 (not shown). Turntable 61 is used to hold and drive Tap 31, cutting bits 21, a socket to drive the T-nut from the outside hex and hex drive 62 to drive the inner diameter of the hex, or other shape, of the T-nut with a ball detent 64 to hold the T-nut in place while moving down the pipe and to prevent T-nut slip out when handling the T-nut with automatic loading mechanisms (FIG. 13). Turntable 61 is powered by a motor located on the skid carrying the standard lateral reinstatement cutter robot 63. The motor is mounted on a sliding skid that is able to travel axially as the cutter robot extends and retracts axially within the vicinity of the corporation stop 11. Air motor 71 mounted on a standard lateral reinstatement cutter 63 may act as an alternative method for mounting of cutting devices.

A robot assembly 101 with a camera and cutting bit is sent into conduit 13 to find protrusions to determine location of corporation stops 11 visually. Once the robot finds corporation stop 11, it is then used to form one or more openings in liner 17. In another instance, an eddy current probe 72 may be used to find conductive materials, which the corporation stops 11 or host conduits 13 are made from. Probe 72 may be mounted onto the turntable with the cutting bit installed to locate corporation stop 11 in case where the protrusions of corporation stops 11 are not visible or when corporation stops 11 have been intentionally milled flush with the internal wall of conduit 13 prior to lining. When probe 72 locates a brass corporation stop 11, a signal is sent to the operator identifying the center of corporation stop 11. At this time, turntable 61 or air motor 71 may be rotated to a position allowing the cutting bit to form one or more openings in liner 17. Once the opening is cut in liner 17, another robot is inserted into the conduit 13 with a self-tapping T-nut 46 to install self-tapping T-nut 46 and a sealing gasket, or in the instance where corporation stop 11 is already threaded, the T-nut installed is not self-tapping.

Eddy current probe 72 is mounted with a spring in a cylindrical housing 73. In this manner probe 72 can ride along the surface of liner 17 and provide a strong signal to the operator where the center of corporation stop 11 is located. In addition to an eddy current probe, connections can be located utilizing ultrasound, penetrating radar, x-rays, galvametric current differentiation, sonar, and the like.

FIG. 13 shows an automatic loader to hold additional T-nuts. This avoids the need to pull the robot out of the pipe after a reinstatement and insert a new T-nut and then reposition it in the pipe to install another T-nut. To do this would be costly from a time point of view.

Figure 17:
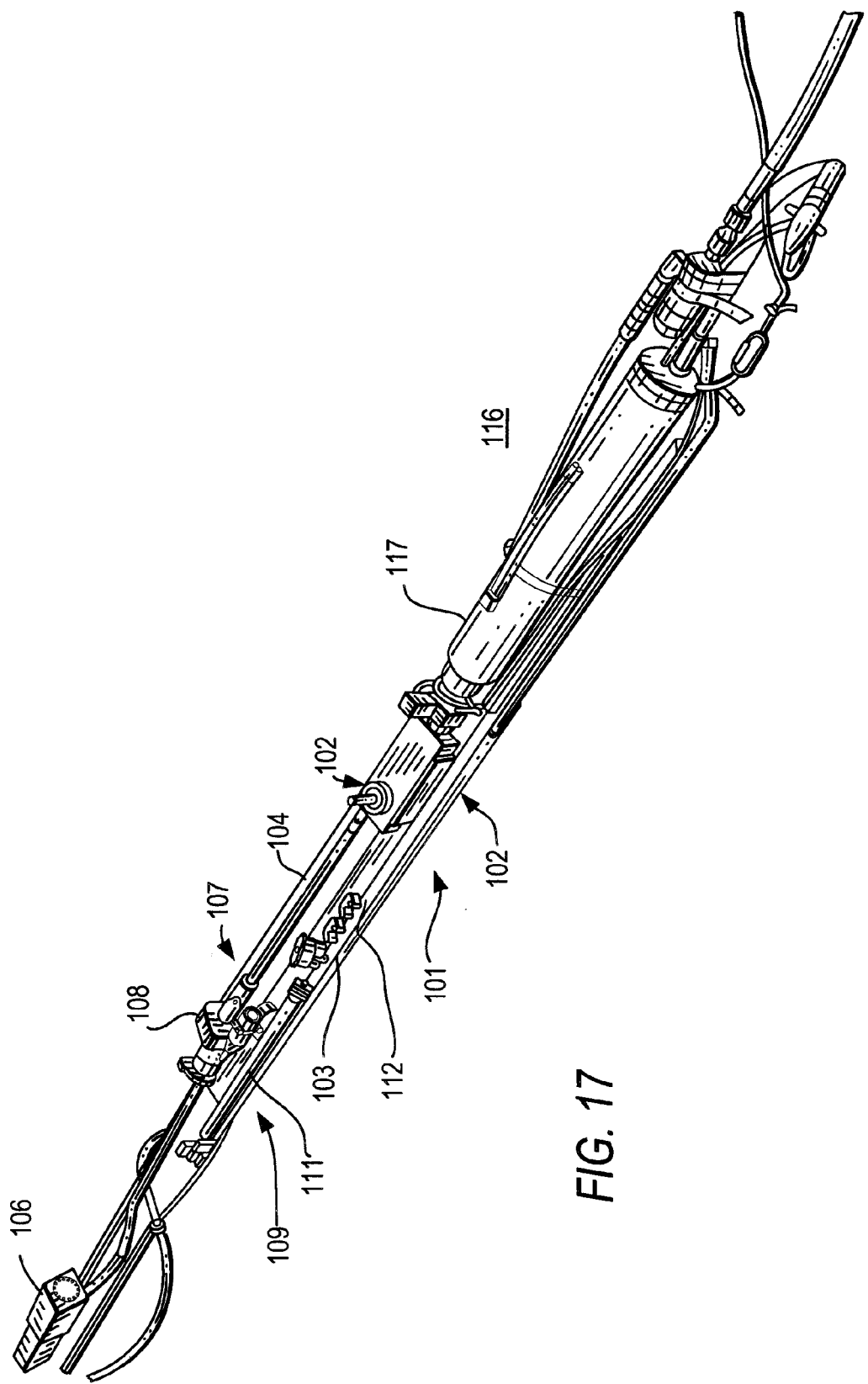
FIG. 17 is perspective view of an assembly with loader constructed and arranged in accordance with the invention.
Figure 18:
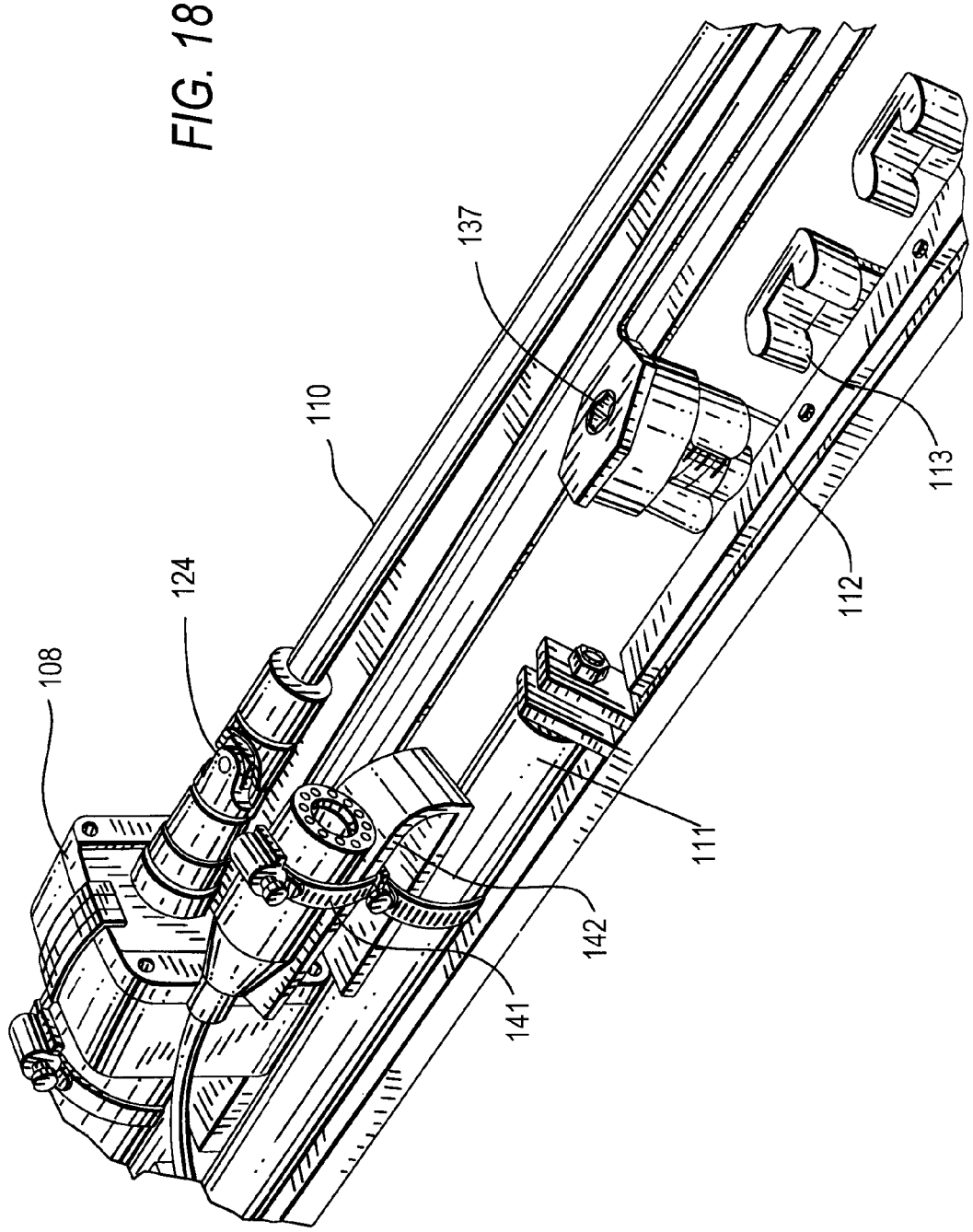
FIG. 18 is a perspective view of the motor and cartridge loader section of the assembly of FIG. 17.

An air cylinder 75 is mounted on one leg or more of a skid that pushes a "slide" that feeds the holster of sealing nuts to where the robot can maneuver and pick up one of the T-nuts. Once a T-nut is removed from the holster, the air cylinder retracts the slide to keep it out of the way of the reinstatement and sealing operation. The slide and skid allow for more than the one nut as depicted now in FIG. 13 and is shown in FIGS. 17 and 18.

Figure 15:
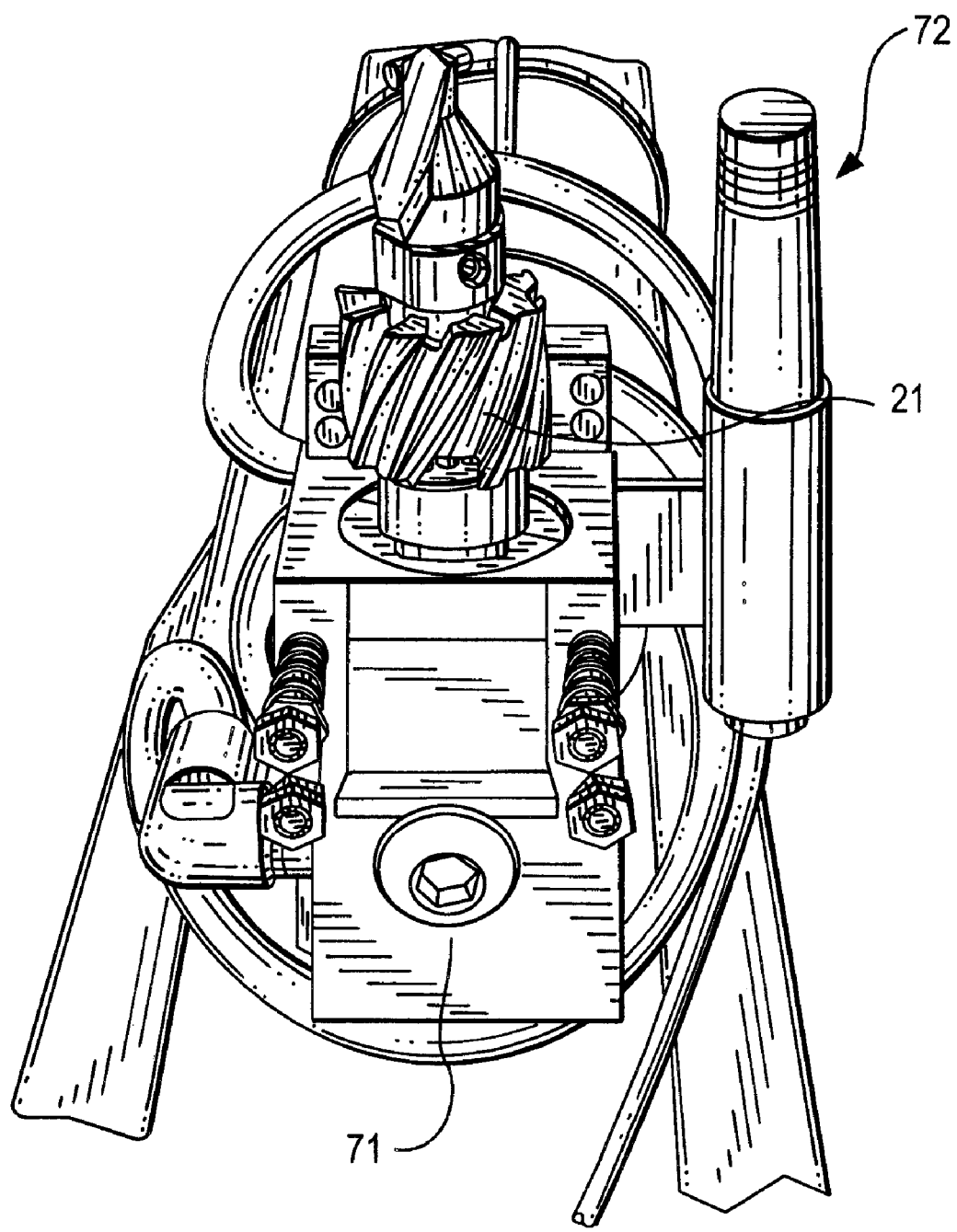
FIG. 15 is a perspective view of cutting/milling apparatus of FIG. 14.
Figure 16:
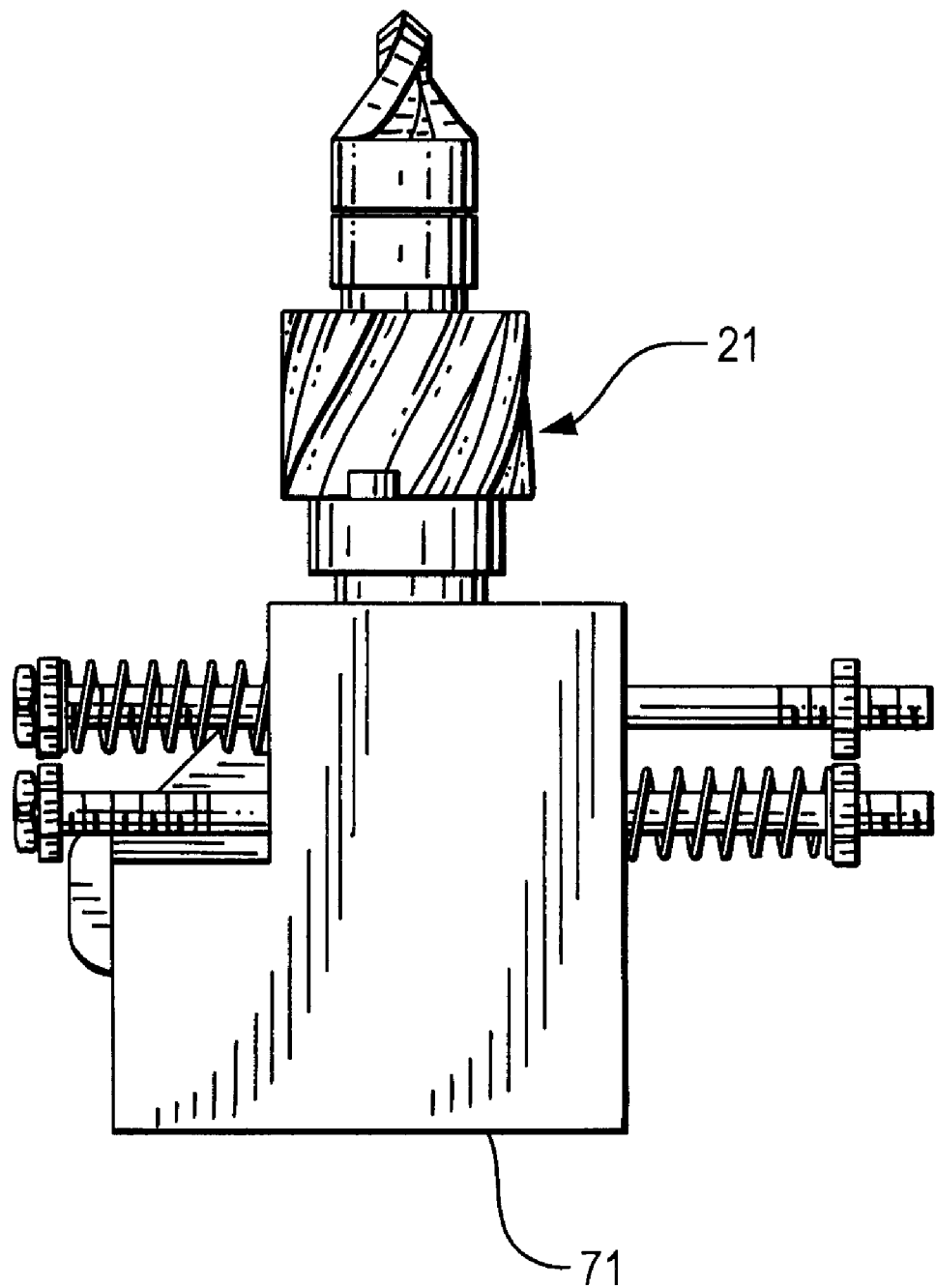
FIG. 16 is an elevational view of an air motor utilized for mounting cutting bits on the loader of FIGS. 14 and 15.

FIG. 14 shows an air motor 71 that mounts onto a standard lateral reinstatement cutter 63 (not shown). Air motor 71 is used to hold and drive cutting bits 21. Air motor 71 may include self-centering spring mechanism that allows the cutting bits to self align in the axial direction of conduit 13. Air motor 71 may also include remote sensing technology, such as eddy current probe 72. Sensing probes may be mounted in a spring mechanism to allow intimate contact with liner 17, while also allowing radial movement of the cutting bits when making concentric openings in liner 17. This is shown in a perspective view of air motor and sensing apparatus in FIG. 15. FIG. 16 is an elevational view of air motor 71 utilized for mounting cutting bits 21 depicted in FIGS. 14 and 15.

There are various ways to carry the sealing nut on the robot. For example, the nut may rest in a hexagonal socket. This may tend to be a loose fit and can "wobble" out of the socket. The robot of FIG. 13 for picking up a nut out of the loader holster utilizes a hexagonal driver stem which is mounted in the turntable of the robot. This driver stem include a ball detent and is inserted into the hexagonal bore of the sealing nut. The driver stem has a ball detent on the side, which prevents the nut from sliding off the driver stem and to prevent T-nut slip out when handling the T-nut with automatic loading mechanisms (FIG. 13). A improved loader causing plurality of T-nuts is shown in the sealing assembly of FIGS. 17-20.

Referring now to FIGS. 17-20, an internal reinstatement and sealing assembly 101 constructed and arranged in accordance with the invention is shown. Sealing assembly 101 includes a frame in the form of a sled 102 with a pair of runners 103 and 104. A camera 106 is located at one end of frame 102 and a motor subassembly shown generally at 107 includes an electric motor 108 and a loader 109 is mounted inward of camera 106. Loader 109 includes an air cylinder 111 with a cartridge slide 112 that is coupled to the piston in air cylinder 111. Cartridge slide 112 rides in a groove 105 in sled 102 as shown in FIG. 19 and carries a plurality of T-nut fittings 131. Cartridge slide 112 extends from air cylinder 111 to position a T-nut filling for loading as described below.

Assembly 101 includes a robot section 116 at the opposite end of frame 102. Robot section 116 is an elongated rigid electrically controlled cylinder 117 having an extension arm 119 that extends from cylinder 117 which can be extended and retracted selectively. A rotating cylinder 118 which can be rotated selectively clockwise or counterclockwise is mounted to extension arm 119 with a lift rack 120 secured to rotating cylinder 118. A turntable 121 with a hex drive 122 is operatively connected to motor 108 by a driveshaft 110 and a first universal joint 124 and a second universal joint 126.

By providing these various elements such as rotating cylinder 118, extension arm cylinder 119 and lift rack 120, T-nut 131 can be successfully installed into the bore of an existing corporation stop in the lined conduit. As described earlier and as shown in FIGS. 19 and 20, T-nut 131 with a sealing gasket 132 has a hexagonal base 133. In this case, base 133 is hexagonal which allows installation utilizing a turntable having a hexagonal main cavity for turning T-nut 131 during sealing and/or installation.

Figure 20:
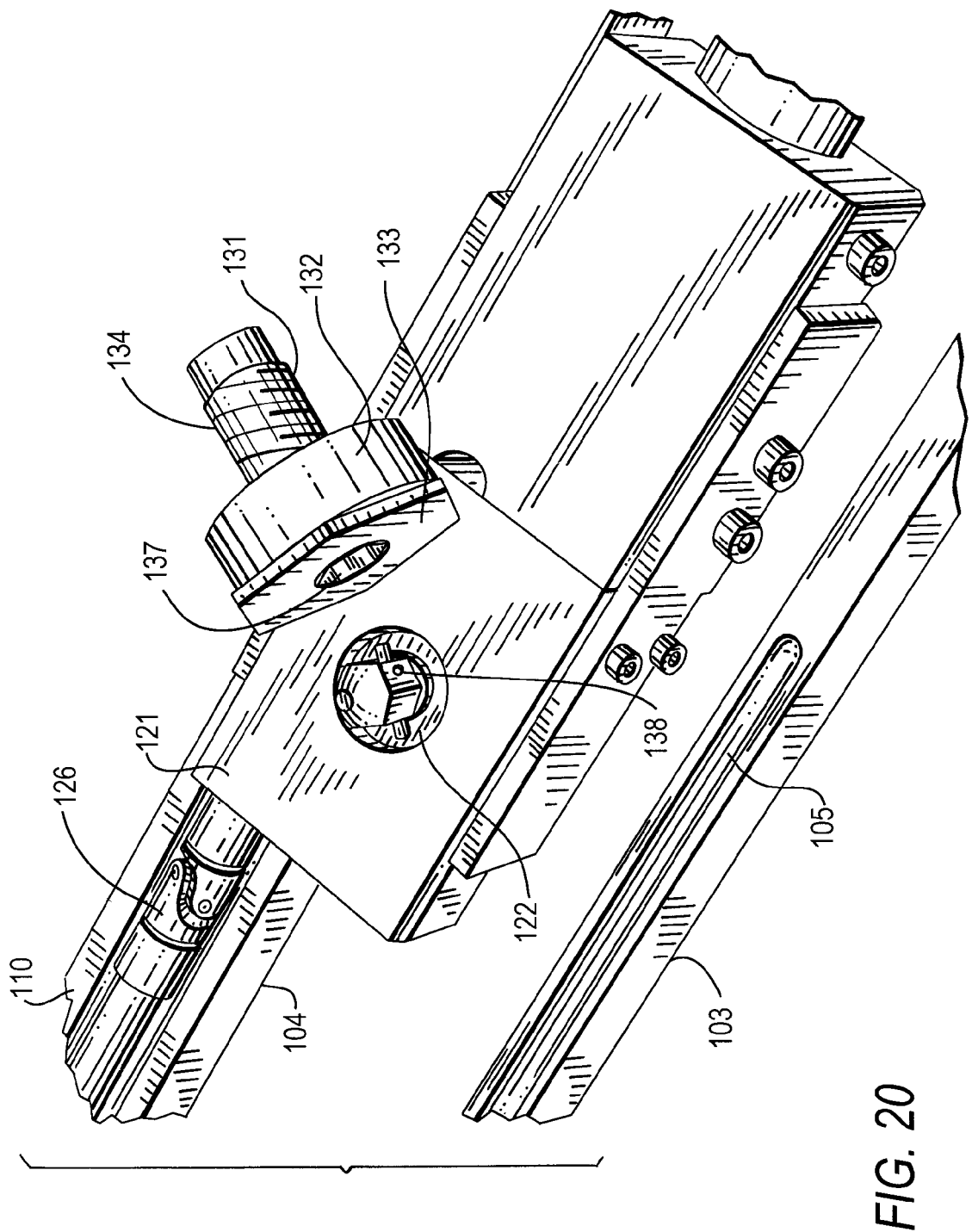
FIG. 20 is a perspective view of the hex drive with ball detent of the turntable shown in FIG. 19.

In the embodiment illustrated in FIGS. 17-20, T-nut 131 includes a hexagonal internal bore 137 as shown in FIG. 20. Hex drive 122 includes a ball detent 138 for securing T-nut 131 to hex drive 122 during pick up and installation. A substantially rigid sealing washer 139 is installed around self-threading portion 134 of T-nut 131 and within the center of compressible sealing donut 132, to ensure a seal with an existing corporation stop in the conduit. Sealing washer 139 is formed of a substantially rigid engineering plastic, such as nylon, LDPE, polyester, polyacetal, PTFE and the like to assist in the seal between the base of T-nut 131 and the corporation stop and the lined conduit wall.

T-nut 131 includes a cylindrical self threading portion 134 with a pilot end 136. Self threading portion 134 includes a coarse thread to prevent stripping or coarse threading set at approximately 10° in order to accommodate for variances in water corporation diameters. This also reduces the amount of torque required to thread T-nut 131.

Referring again to FIGS. 17 and 18, and 19 and 20, the detail of cartridge slide 112 with multiple brackets 113 is shown in detail. Here, self threading portion 134 of T-nut 131 is mounted in bracket 113 with hex bore 137 facing the center of the conduit. In this case, once an internal reinstatement has been completed and turntable 121 is positioned over cartridge slide 112 that is extended from air cylinder 111 so that, turntable 121 can be lowered to allow hex drive 122 to enter and engage internal bore 137 of T-nut 131. By rotating rotating cylinder 118 and turntable 121 in a clockwise direction, T-nut 131 is removed from bracket 113 and is ready for installation into the next corporation stop to be reinstated. Camera 141 and camera mounting bracket 142 aid in the visual location of T-nut 131 in bracket 113.

By providing internal tapping assembly 101 with cartridge slide 112 holding a plurality of T-nuts 131, several internal taps can be completed without the necessity to remove internal tapping assembly 101 from the line conduit in order to reload turntable 121.

Loader section 109 includes a camera 141 to facilitate positioning and providing information to an operator as T-nut 131 is positioned and installed. Motor 108 is a variable speed motor that allows appropriate speed for installing T-nuts 131 into the existing corporation stops. Motor 108 generally is driven electrically. While internal reinstatement and sealing assembly 101 is shown with rigid sled 102, it is contemplated within the scope of the invention to utilize any robot positioning device such as tractors and/or wheels. At time installation of a T-nut may restrict flow to the connection. In this case the bore of the connection or corporate stop can be enlarged and a larger diameter T-nut with larger bore can be installed to restore full fluid flow.

It can readily be seen that the process in accordance with the invention readily allows one to conveniently install an internal tap to connect and seal the corporation stop and synthetic liner. It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

It can readily be seen that the process in accordance with the invention readily allows one to conveniently install an internal tap to connect and seal the corporation stop and synthetic liner. It will thus be seen that the objects set fort above, among those made apparent from the preceding description, are efficiently attained and, since certain changes may be made and carrying out the above method and in the construction set forth without departing from the spirit and scope of the invention it is intended that all matter contained in the above description and shown in the accompanying drawings shall be interpreted as illustrative and not in a limiting sense It is also to be understood that the following claims are intended to cover all of the generic and specific features of the invention which, as a matter of language, might be said to fall there between.

What is claimed is:

1. An assembly for reinstating a connection in a conduit having an internal lining, comprising
   an elongated frame having a first end and a second end;
   a camera located at one end and a robot assembly at the other end of the frame;
   a motor mounted on the frame;
   a cylinder with a cartridge slide coupled to a cartridge motor, the cartridge slide holding a plurality of T-nuts for installation into a connection in the conduit;
   the robot assembly including a cylinder having an arm that can be rotated and extended and retracted selectively;
   a lift rack mounted to the arm; and
   a turntable including a drive element mounted on the lift rack and operatively connected to the motor,
   whereby the drive element can be selectively positioned to engage a fitting stored on the cartridge slide and position the fitting for installation into a connection in the conduit.

2. The assembly of claim 1, further including a cutting element on the turntable for cutting at least one opening in the liner for inserting a T-nut.

3. The assembly of claim 1, further including a remote sensing mechanism mounted on the frame and biased towards a conduit wall.

4. The assembly of claim 3, wherein the remote sensing mechanism is an eddy current detector.

\* \* \* \* \*